(12) United States Patent
Inoue

(10) Patent No.: US 11,991,331 B2
(45) Date of Patent: May 21, 2024

(54) SERVER, METHOD OF CONTROLLING THE SERVER, AND STORAGE MEDIUM

(71) Applicant: CANON KABUSHIKI KAISHA, Tokyo (JP)

(72) Inventor: Kenta Inoue, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/939,030

(22) Filed: Sep. 7, 2022

(65) Prior Publication Data

US 2023/0085170 A1 Mar. 16, 2023

(30) Foreign Application Priority Data

Sep. 10, 2021 (JP) .................................. 2021-148079

(51) Int. Cl.
*G06F 15/00* (2006.01)
*H04N 1/00* (2006.01)
*H04N 1/32* (2006.01)
*H04N 1/44* (2006.01)
*G06V 30/14* (2022.01)

(52) U.S. Cl.
CPC ....... *H04N 1/0097* (2013.01); *H04N 1/00217* (2013.01); *H04N 1/00244* (2013.01); *H04N 1/00408* (2013.01); *H04N 1/00482* (2013.01); *H04N 1/32101* (2013.01); *H04N 1/4433* (2013.01); *G06V 30/1444* (2022.01); *H04N 2201/0094* (2013.01); *H04N 2201/3243* (2013.01)

(58) Field of Classification Search
None
See application file for complete search history.

(56) References Cited

U.S. PATENT DOCUMENTS

| | | | |
|---|---|---|---|
| 2018/0139355 A1* | 5/2018 | Watanabe | H04N 1/00344 |
| 2019/0065451 A1* | 2/2019 | Miyamoto | H04N 1/00331 |
| 2019/0289160 A1* | 9/2019 | Hayashi | G06F 9/453 |
| 2020/0336610 A1 | 10/2020 | Mochizuki | |
| 2021/0227082 A1* | 7/2021 | Mori | G06V 30/412 |
| 2021/0306476 A1* | 9/2021 | Inoue | H04N 1/00482 |

FOREIGN PATENT DOCUMENTS

| | | |
|---|---|---|
| JP | 2007049609 A | 2/2007 |
| JP | 2020178280 A | 10/2020 |

* cited by examiner

*Primary Examiner* — Mark R Milia
(74) *Attorney, Agent, or Firm* — ROSSI, KIMMS & McDOWELL LLP

(57) ABSTRACT

A server presents a first setting screen for entering settings relating to target image data for transmission, transmits the target image data to a cloud service in accordance with the settings, stores the settings associated with a type of the target image data and information of a user, and presents a second setting screen for selecting whether or not to use settings identical to any stored settings for new target image data. When presenting the first setting screen, the server presents it in a state in which, from the stored settings which the user selected to use settings identical to, a type of image data is omitted and settings required for transmission have been reflected. The server stores a type of the new target image data added to and associated with the selected stored settings.

14 Claims, 25 Drawing Sheets

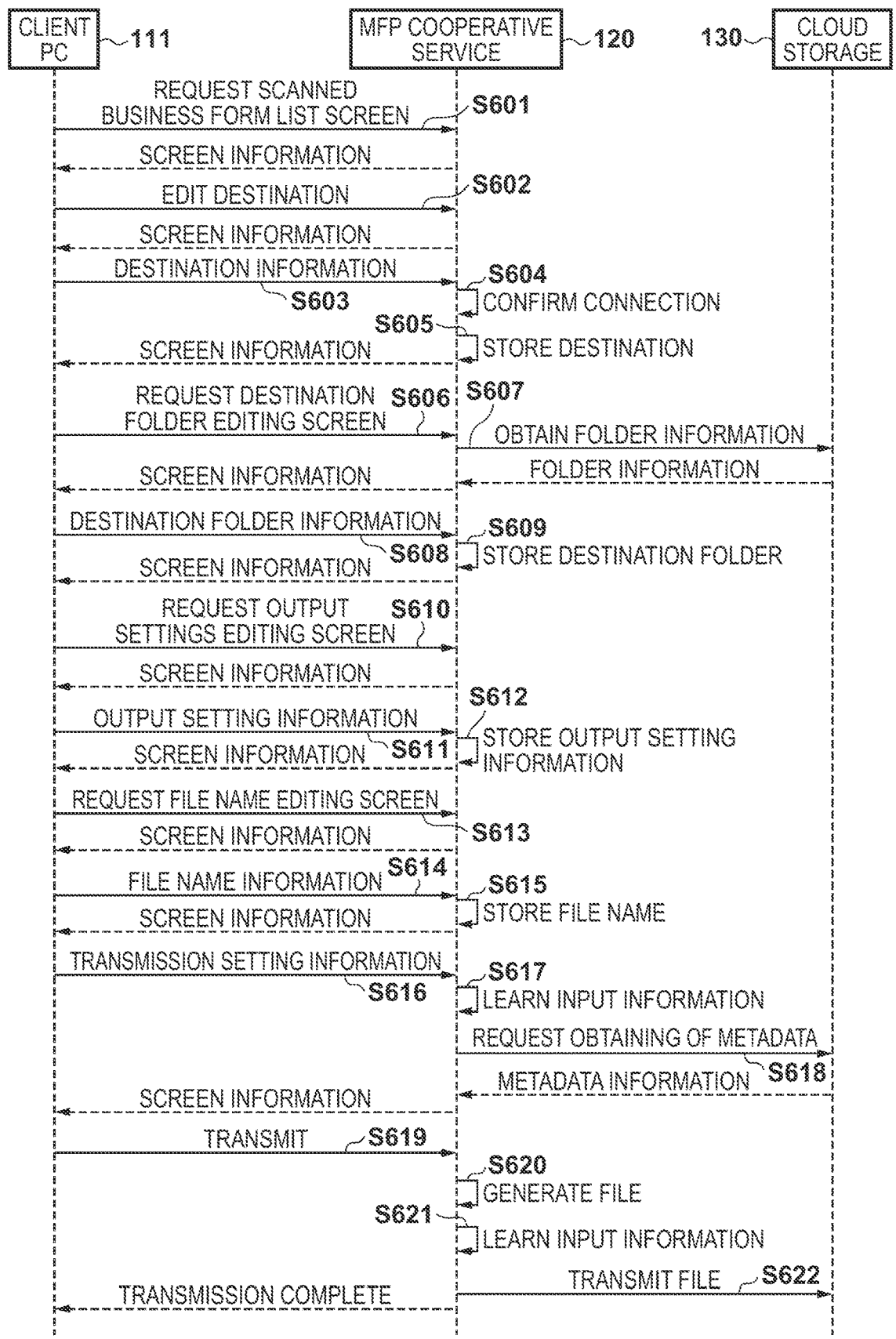

FIG. 8A

SCANNED BUSINESS FORM LIST

| SEND | EDIT | DELETE | | UPDATE |
|------|------|--------|---|--------|

SCAN JOB    DATE    DESTINATION

☑ -NO NAME-  2019/09/19 19:08  NOT SET
  2 PAGES
  (UNLEARNED)

☐ -NO NAME-  2019/09/19 19:10  NOT SET
  2 PAGES
  (UNLEARNED)

☐ -NO NAME-  2019/09/19 19:12  NOT SET
  2 PAGES
  (UNLEARNED)

JOB PROPERTIES

SETTING

DESTINATION
CLICK AND OPEN SETTING

ROOT FOLDER
PLEASE SELECT DESTINATION FIRST

FILE FORMAT
CLOUD COMPRESSION PDF

FILE NAME
NOT SET

[SAVE]

F I G. 8B

SCANNED BUSINESS FORM LIST

| SEND | EDIT | DELETE | | UPDATE |

SCAN JOB | DATE | DESTINATION

- ☐ -NO NAME- 2 PAGES (UNLEARNED) | 2019/09/19 19:08 | NOT SET
- ☑ -NO NAME- 2 PAGES (UNLEARNED) | 2019/09/19 19:10 | NOT SET
- ☐ -NO NAME- 2 PAGES (UNLEARNED) | 2019/09/19 19:12 | NOT SET

JOB PROPERTIES (804)

PLEASE SELECT A SETTING METHOD.

NEW SETTING (815)
NEWLY SET DESTINATION SETTING.

APPROPRIATE EXISTING SETTING (816)
SETTINGS SUCH AS DESTINATION OF EXISTING LEARNING DATA WILL BE APPROPRIATED.

APPROPRIATE EXISTING SETTING

PLEASE SELECT TRANSMISSION SETTING TO BE APPROPRIATED. LEARN FORMS ASSOCIATED WITH SAME SETTING.

| NAME | DESTINATION | FOLDER | FILE NAME | FILE FORMAT |
|---|---|---|---|---|
| PURCHASE ORDER | CLOUD A | 2019/[COMPANY NAME]_COMPLETE/{MONTH} | [DOCUMENT NAME]_[COMPANY NAME]_{YEAR}{MONTH}{DAY} | CLOUD COMPRESSION PDF |
| PAMPHLET | CLOUD A | 2019/OTHER/PAMPHLET | [DOCUMENT NAME]_{YEAR}{MONTH}{DAY} | CLOUD COMPRESSION PDF |
| AA ASSOCIATION | CLOUD B | PROJECT/AA/{YEAR} | [DOCUMENT NAME]_{USER NAME}_{YEAR}{MONTH}{DAY} | CLOUD COMPRESSION PDF |
| BB ASSOCIATION | CLOUD B | PROJECT/BB/{YEAR} | [DOCUMENT NAME]_{USER NAME}_{YEAR}{MONTH}{DAY} | CLOUD COMPRESSION PDF |

CANCEL    OK

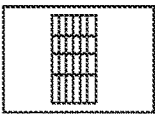

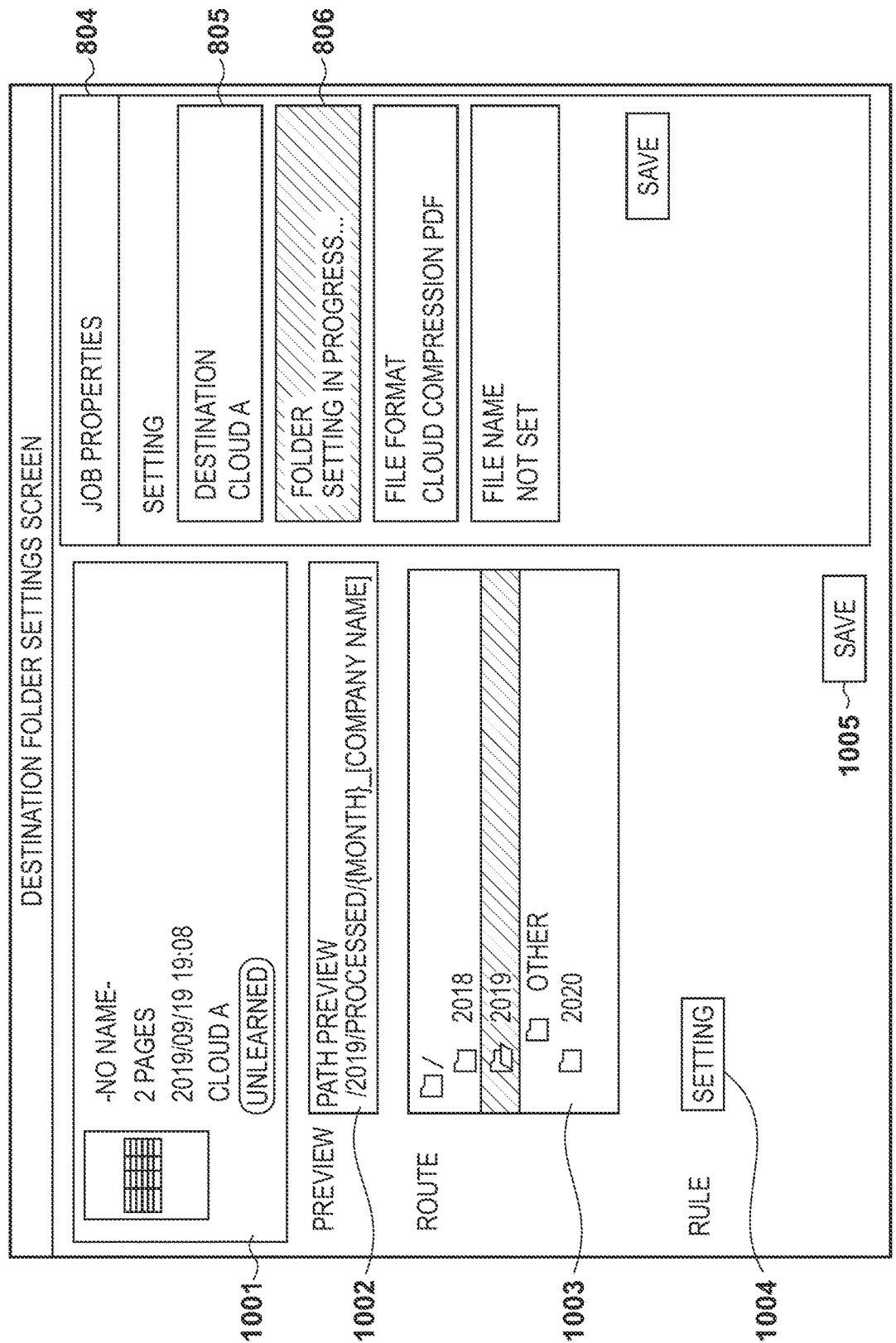

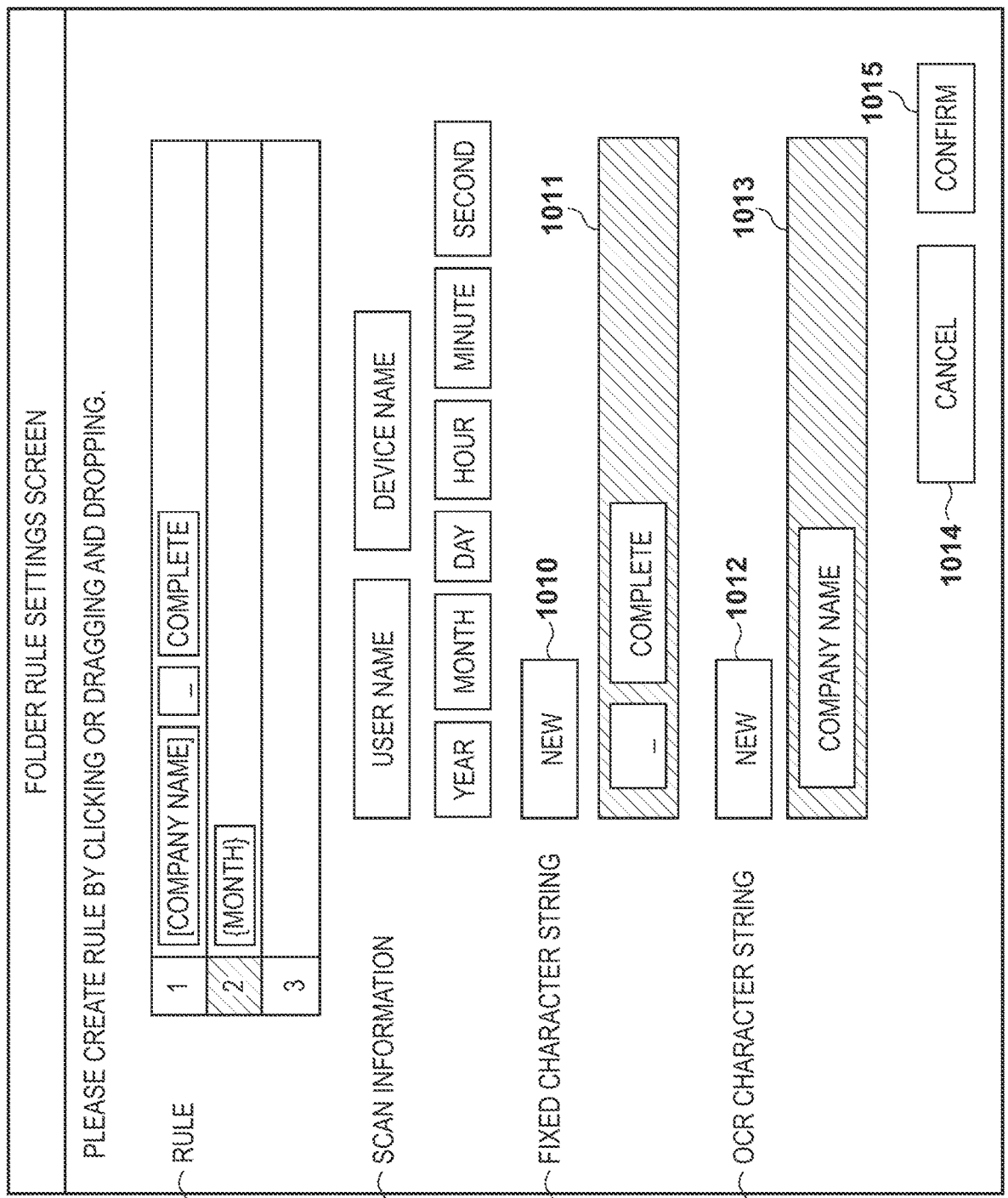

FIG. 11A

| NEWLY CREATE FIXED CHARACTER STRING |
|---|

PLEASE INPUT FIXED CHARACTER STRING TO BE USED

FIXED CHARACTER STRING: PROCESSED — 1116

1117 — CANCEL | OK — 1118

FIG. 11B

| NEWLY SELECT OCR CHARACTER STRING |
|---|

PLEASE SELECT CHARACTER STRING TO BE USED FROM PREVIEW

QUOTATION — 1119

〒100-9999
TOKYO-TO, MINATO-KU B-B-B

QUOTATION NUMBER: R12-3456
ISSUANCE DATE: 2017/09/10

1120 — SHINAGAWA Ltd. ⊗ — 1121  TO

| ITEM | UNIT PRICE | QUANTITY | MONEY AMOUNT |
|---|---|---|---|
| GF-1544 | 11,550 | 3 | 34,650 |
| EF24-70 | 134,100 | 1 | 134,100 |
|  |  |  |  |
|  |  |  |  |
|  |  | TOTAL | 168,750 |

PREVIEW: SHINAGAWA Ltd. — 1122

FIELD NAME: COMPANY NAME — 1123

1124 — CANCEL | OK — 1125

FIG. 13

EDIT SCANNED BUSINESS FORM DATA FILE NAME

1301 — [DOCUMENT NAME]_[COMPANY NAME]_{YEAR}{MONTH}{DAY}
2 PAGES
2019/09/19 19:08
CLOUD A
(UNLEARNED)

PLEASE CREATE RULE BY CLICKING OR DRAGGING AND DROPPING.

1302 — RULE  [DOCUMENT NAME]_[COMPANY NAME]_{YEAR}{MONTH}{DATE}

1303 — SCAN INFORMATION  [DOCUMENT NAME] [USER NAME] [DEVICE NAME]
[YEAR][MONTH][DAY][HOUR][MINUTE][SECOND]

1304 — FIXED CHARACTER STRING  NEW —1306   _   COMPLETE  1307

1305 — OCR CHARACTER STRING  NEW —1308  [COMPANY NAME][DOCUMENT NAME]  1309

1310 — SAVE

JOB PROPERTIES

SETTING

DESTINATION
CLOUD A

FOLDER
/2019/[COMPANY NAME]_COMPLETE/{MONTH}

FILE FORMAT
CLOUD COMPRESSION PDF

FILE NAME
SETTING IN PROGRESS...

SAVE — 809

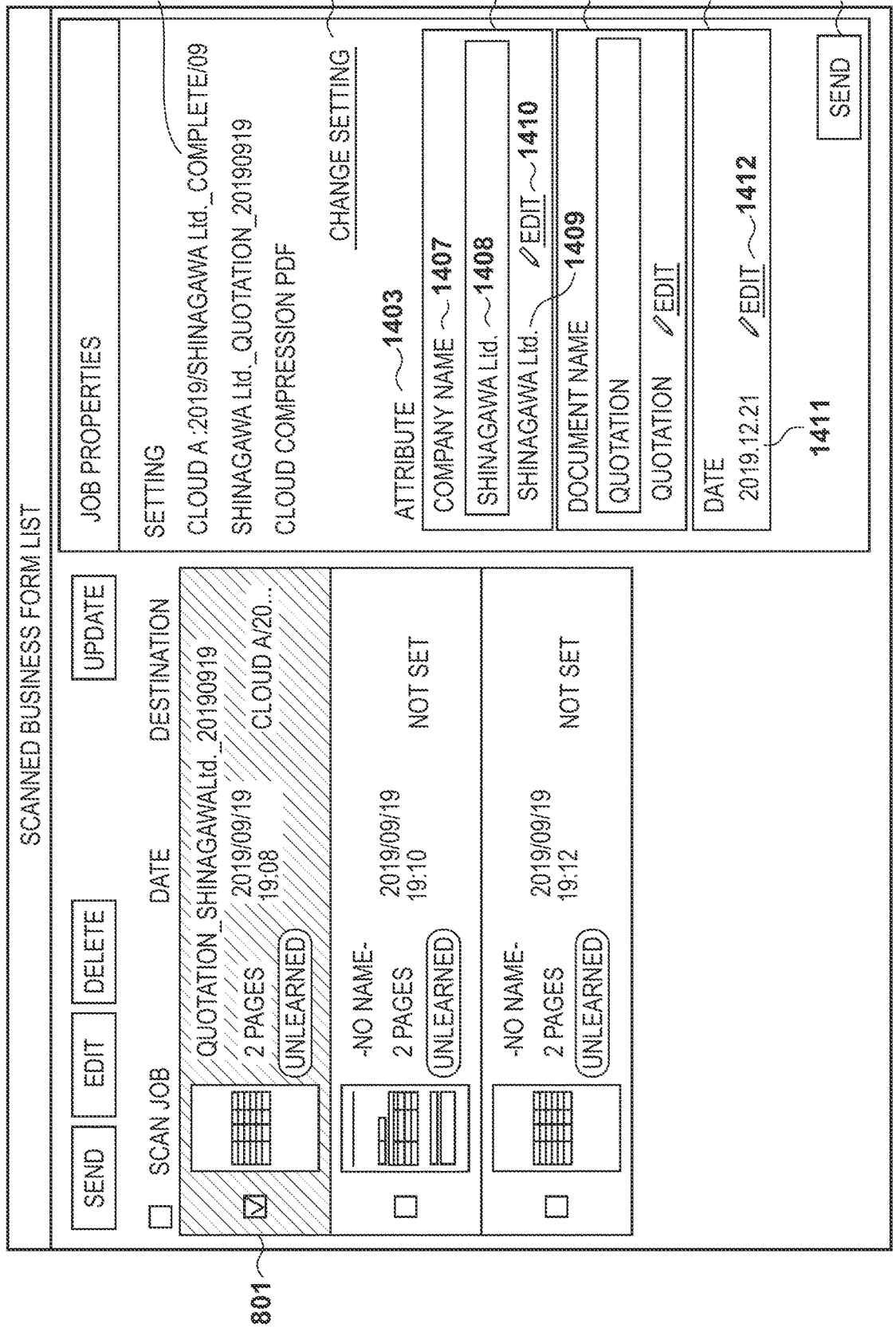

SELECT CHARACTER STRING TO BE USED IN COMPANY NAME OF FILE NAME OF SCANNED BUSINESS FORM DATA

PLEASE SELECT CHARACTER STRING TO BE USED IN COMPANY NAME FROM PREVIEW.

― 1515
― 1514

⊗ INVOICE

〒100-9999
TOKYO-TO, MINATO-KU B-B-B
SHINAGAWA Ltd. TO

INVOICE No: S-1234
INVOICE DAY: 2019/09/10
DEPOSIT DEADLINE: 2019/09/30

YOUR INVOICE IS AS FOLLOWS.

| INVOICE AMOUNT | ¥69,300 |

INVOICE CONTENTS

| DATE | CONTENTS | MONEY AMOUNT |
|---|---|---|
| 2019/8/31 | SET OF CONSTRUCTION MATERIALS | 63,000 |
| | SUBTOTAL | 63,000 |
| | CONSUMER TAX | 6,300 |

COMMENTS:

TRANSFER DESTINATION
KANAGAWA BANK KAWASAKI BRANCH
NORMAL ACCOUNT 000-000-000
KAWASAKI Ltd.

SAVE ― 1516

1513

JOB PROPERTIES

SETTING
CLOUD A :2019/[COMPANY NAME]_COMPLETE/09
[COMPANY NAME]_INVOICE_20190919
CLOUD COMPRESSION PDF

CHANGE SETTING

ATTRIBUTE

COMPANY NAME — 1404
⊕ SELECT OCR CHARACTER STRING
NO NAME ✐ EDIT

DOCUMENT NAME — 1405
INVOICE
NO NAME ✐ EDIT

DATE
2019.12.21 ✐ EDIT

SEND — 809

FIG. 16A

| No | USER | NAME | DESTINATION | ROOT FOLDER | FOLDER RULE | FILE NAME RULE |
|---|---|---|---|---|---|---|
| 1 | A | PURCHASE ORDER | CLOUD A | 2019/ | [COMPANY NAME]_ COMPLETE/{MONTH} | [DOCUMENT NAME]_ [COMPANY NAME]_ {YEAR}{MONTH}{DAY} |
| 2 | A | PAMPHLET | CLOUD A | 2019/OTHER/PAMPHLET | | [DOCUMENT NAME]_ {YEAR}{MONTH}{DAY} |
| 3 | A | AA ASSOCIATION | CLOUD B | PROJECT/ | AA/{YEAR} | [DOCUMENT NAME]_ [USER NAME]_{YEAR} {MONTH}{DAY} |
| 4 | A | BB ASSOCIATION | CLOUD B | PROJECT/ | BB/{YEAR} | [DOCUMENT NAME]_ [USER NAME]_{YEAR} {MONTH}{DAY} |
| 5 | B | CONTRACT | CLOUD C | DOCUMENTS ON FILE /CONTRACT | {YEAR}/{MONTH} | {YEAR}{MONTH}{DAY}_ [DOCUMENT NAME]_ [COMPANY NAME] |
| 6 | B | REQUEST FOR MANAGERIAL DECISION | CLOUD C | DOCUMENTS ON FILE/ REQUEST FOR MANAGERIAL DECISION | {YEAR}/{MONTH} | {YEAR}{MONTH}{DAY}_ [DOCUMENT NAME]_ [PROJECT NAME] |
| 7 | C | PROJECT AA | CLOUD B | PROJECT/AA/WORK | {USER NAME} | [DOCUMENT NAME]_ {YEAR}{MONTH}{DAY} |
| 8 | C | PROJECT BB | CLOUD B | PROJECT/BB/WORK | {USER NAME} | [DOCUMENT NAME]_ {YEAR}{MONTH}{DAY} |

FIG. 16B

| 1617 | 1618 | 1619 | 1620 |
|---|---|---|---|
| FILE FORMAT | METADATA () | formID | OCR([FIELD NAME], CHARACTER REGION (x, y, width, height)) |
| CLOUD COMPRESSION PDF | | u3n4-azdt-48k8-ukci-5kpe | [COMPANY NAME], (406, 626, 594, 71)<br>[DOCUMENT NAME], (1019, 303, 489, 95) |
| CLOUD COMPRESSION PDF | | cb2b-4asa-4cbe-bg8d-yjrr | [COMPANY NAME], (328, 633, 587, 71)<br>[DOCUMENT NAME], (325, 276, 388, 85) |
| CLOUD COMPRESSION PDF | | xu4e-uaxt-97pr-h3t2-pftm | [DOCUMENT NAME], (212, 1356, 1027, 80) |
| CLOUD COMPRESSION PDF | | 3j23-ii4s-kyz2-m7mc-wh94 | [DOCUMENT NAME], (302, 285, 599, 95) |
| CLOUD COMPRESSION PDF | | d6ec-y3xp-fig2-s9cf-94az | [DOCUMENT NAME], (508, 377, 612, 95) |
| CLOUD COMPRESSION PDF | | cyz8-arzs-gi52-yaxx-eygf | [DOCUMENT NAME], (432, 353, 471, 95) |
| CLOUD COMPRESSION PDF | | 99kj-jjni-mz72-8mpj-awjk | [DOCUMENT NAME], (323, 288, 666, 95) |
| CLOUD COMPRESSION PDF | | 5jju-7rd7-khhm-38n2-ynih | [DOCUMENT NAME], (1311, 289, 321, 95) |
| CLOUD COMPRESSION PDF | [CONTRACT DATE], text | 45fd-k6rb-zbpm-wkwm-nszx | [DOCUMENT NAME], (1055, 298, 502, 88)<br>[COMPANY NAME], (400, 688, 821, 67)<br>[CONTRACT DATE], (1912, 388, 260, 54) |
| CLOUD COMPRESSION PDF | [APPLICATION DATE], text<br>[APPROVAL DATE], text | uf4e-i2w4-dsx5-zik8-yw34 | [DOCUMENT NAME], (988, 322, 681, 88)<br>[PROJECT NAME], (400, 1356, 230, 74)<br>[APPLICATION DATE], (1872, 443, 230, 54)<br>[APPROVAL DATE], (1872, 527, 259, 54) |
| CLOUD COMPRESSION PDF | | xwru-gfdd-9p6d-b8ex-wuu6 | [DOCUMENT NAME], (388, 302, 771, 95) |
| CLOUD COMPRESSION PDF | | mx74-6rca-y8w8-57gr-nzx8 | [DOCUMENT NAME], (387, 298, 345, 95) |
| CLOUD COMPRESSION PDF | | pe9r-ac4k-2ekt-nmrj-9fzm | [DOCUMENT NAME], (399, 288, 871, 95) |
| CLOUD COMPRESSION PDF | | 7xnf-sxc3-39cy-9j4s-4f35 | [DOCUMENT NAME], (377, 305, 901, 95) |

SERVER, METHOD OF CONTROLLING THE SERVER, AND STORAGE MEDIUM

BACKGROUND OF THE INVENTION

Field of the Invention

The present invention relates to a server, a method of controlling the server, and a storage medium.

Description of the Related Art

There is an increasing number of multi-function peripherals (MFPs) that cooperate with a cloud service providing a service such as cloud storage. Such MFPs can be used to transmit image data obtained by the MFP scanning a document to a cloud service specified by a user. Here, the user specifies the cloud service or a folder to transmit the image data to and also sets the file name before executing processing to transmit the image data. Time and effort are required to use a keyboard or the like at this time to set the file name. In light of this, the technology described in Japanese Patent Laid-Open No. 2020-178280 displays a preview of a scanned image and uses an OCR result of a character region of the scanned image selected by the user for the file name, metadata, and the like of the image data. In another example, the technology described in Japanese Patent Laid-Open No. 2007-49609 shares the personal setting information file of an MFP apparatus associated with personal authentication on a network so that it can be used by other MFP apparatuses.

According to Japanese Patent Laid-Open No. 2020-178280, when an image similar to a past scanned image is scanned, the file name set for the previous similar image and the character string of the same position are used to set to unique file name for the scanned image data, reducing the setting time and effort. However, because the destination setting needs to be set in advance, for example, with business forms without set storage rules, each user cannot freely specify and manage the storage rules. Also, in Japanese Patent Laid-Open No. 2007-49609, by storing information associated with personal authentication and set by an individual and allowing the information to be used to specify the file name and the like, the setting load relating to a new type of image data is reduced. However, as in Japanese Patent Laid-Open No. 2020-178280, in a case in which a setting rule to use a character string in the scanned image is included, when the position information of the character string is used without change for a different type of image, an unintended character string may be extracted causing inconvenience.

SUMMARY OF THE INVENTION

An aspect of the present invention is to eliminate the above-mentioned problem with conventional technology.

A feature of the present invention is to provide a technique for improving the ease of use when a user sets the settings for transmitting image data to a service.

According to a first aspect of the present invention, there is provided a server configured to access a cloud service comprising: one or more controllers including one or more processors and one or more memories, the one or more controllers being configured to: present, to an information processing apparatus, a first setting screen for entering settings relating to target image data for transmission; transmit the image data for transmission to the cloud service in accordance with the settings, entered via the first setting screen, relating to the target image data received from a user of the information processing apparatus; store, in a storage, the settings, entered by the user via the first setting screen, relating to the target image data associated with a type of the target image data and information of the user; and present, to the information processing apparatus, a second setting screen for selecting whether or not to use settings identical to any settings stored in the storage for new target image data, wherein the one or more controllers present, when presenting the first setting screen, the first setting screen in a state in which, from the settings stored in the storage which the user selected to use settings identical to via the second setting screen, a type of image data is omitted and settings required for transmission have been reflected, and wherein, when storing the settings relating to the target image data, the one or more controllers store a type of the new target image data added to and associated with the selected settings stored in the storage.

According to a second aspect of the present invention, there is provided a server configured to access a cloud service comprising: one or more controllers including one or more processors and one or more memories, the one or more controllers being configured to: present, to an information processing apparatus, a first setting screen for entering settings relating to target image data for transmission; transmit the target image data to the cloud service in accordance with the settings relating to the target image data received from a user of the information processing apparatus via the first setting screen; store, in a storage, the settings relating to the target image data received from the user via the first setting screen associated with a type of the target image data and information of the user; and present, to the information processing apparatus, a second setting screen for selecting whether or not to use settings identical to any settings stored in the storage for new target image data for transmission, wherein the one or more controllers present, when presenting the first setting screen, the first setting screen in a state in which, from the settings stored in the storage which the user selected to use settings identical to via the second setting screen, a type of image data is omitted and settings required for transmission have been reflected, and wherein, when storing the settings relating to the target image data, the one or more controllers store a type of the new target image data added to and associated with the selected settings stored in the storage, wherein the information processing apparatus is configured to be operated by a user, and wherein a user of the information processing apparatus transmits, from the server to the cloud service, a file of the target image data in accordance with content set via the first setting screen and the second setting screen.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a sequence diagram of business form data transmitted to the MFP cooperative service according to this embodiment being viewed and operated using the client PC and being transmitted to cloud storage.

FIG. 8A is a diagram illustrating an example of a case of performing new transmission settings for unlearned scanned business form data using the screen of a list of scanned business form data displayed on the client PC according to this embodiment.

FIG. 8B is a diagram illustrating an example of a screen for selecting whether to appropriate the transmission settings set for another existing scanned business form data or set new settings for a scanned business form data without a similar business form (unlearned) on the screen of a list of the scanned business form data displayed by the client PC according to this embodiment.

FIG. 9A is a diagram illustrating an example of the screen of a list of transmission settings displayed by the client PC when existing transmission settings are appropriated.

FIG. 9B is a diagram illustrating an example of the destination setting screen displayed by the client PC according to this embodiment.

FIG. 10A is a diagram illustrating an example of the setting screen for the destination folder displayed by the client PC according to this embodiment.

FIG. 10B is a diagram illustrating an example of the setting screen for the folder rules displayed by the client PC according to this embodiment.

FIG. 11A is a diagram illustrating an example of the fixed character string creation screen displayed by the client PC according to this embodiment.

FIG. 11B is a diagram illustrating an example of the OCR character string new selection screen displayed by the client PC according to this embodiment.

FIG. 13 is a diagram illustrating an example of the file name editing screen displayed by the client PC according to this embodiment.

FIGS. 14A and 14B are diagrams illustrating examples of the screen of a list of the scanned business form data displayed by the client PC according to this embodiment.

FIG. 15 is a diagram illustrating an example of a screen displayed by the client PC according to this embodiment when selecting a character string to be used as the company name for the file name of the scanned business form data.

FIGS. 16A and 16B are diagrams illustrating an example of a setting information management table according to this embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
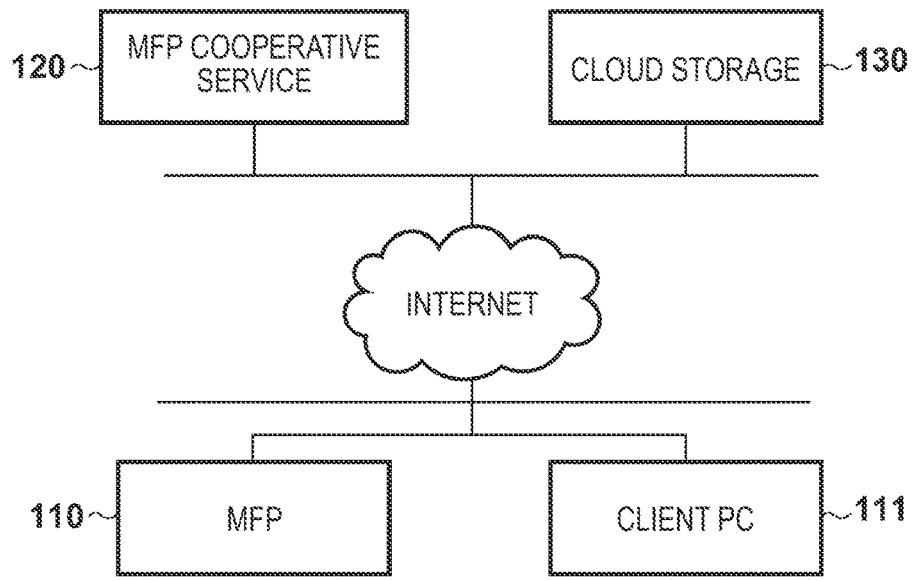
FIG. 1 is a diagram for describing the overall configuration of an image processing system according to an embodiment of the present invention.

FIG. 1 is a diagram for describing the overall configuration of an image processing system according to an embodiment of the present invention.

The image processing system includes an MFP 110, a client personal computer (PC) 111, an MFP cooperative service 120, and a cloud storage 130. The MFP 110 and the client PC 111 are communicatively connected with a server that providing various types of services on the Internet via a local area network (LAN).

The MFP 110 is a multi-function peripheral with a plurality of functions, including scanning and printing, and is an example of an image forming apparatus. The client PC 111 is an information processing apparatus that is provided with the service for which a request was sent to the MFP cooperative service 120. The MFP cooperative service (web server) 120 is an example of a service with functions including storing on its own server the image data file obtained via scanning by the MFP 110 and transferring the image data to another service able to store image data files, such as a storage service. The cloud storage (service) 130 stores the file received via the Internet. Also, the cloud storage 130 may provide a service enabling an external apparatus to obtain a file from the cloud storage 130 via a web browser. Note that the cloud storage is not limited to the illustrated cloud storage 130, and a plurality of cloud storages may exist in the image processing system (not illustrated).

The image processing system according to this embodiment has a configuration that includes the MFP 110, the client PC 111, the MFP cooperative service 120, and the cloud storage 130, but the present invention is not limited thereto. For example, the MFP 110 may be also provided with the functions of the client PC 111 and the MFP cooperative service 120. Also, the MFP cooperative service 120 may be connected to a server on a LAN instead of the Internet. Also, the cloud storage 130 may be substituted for an email server or the like, and the image data obtained via scanning may be attached to an email and transmitted.

Figure 2:
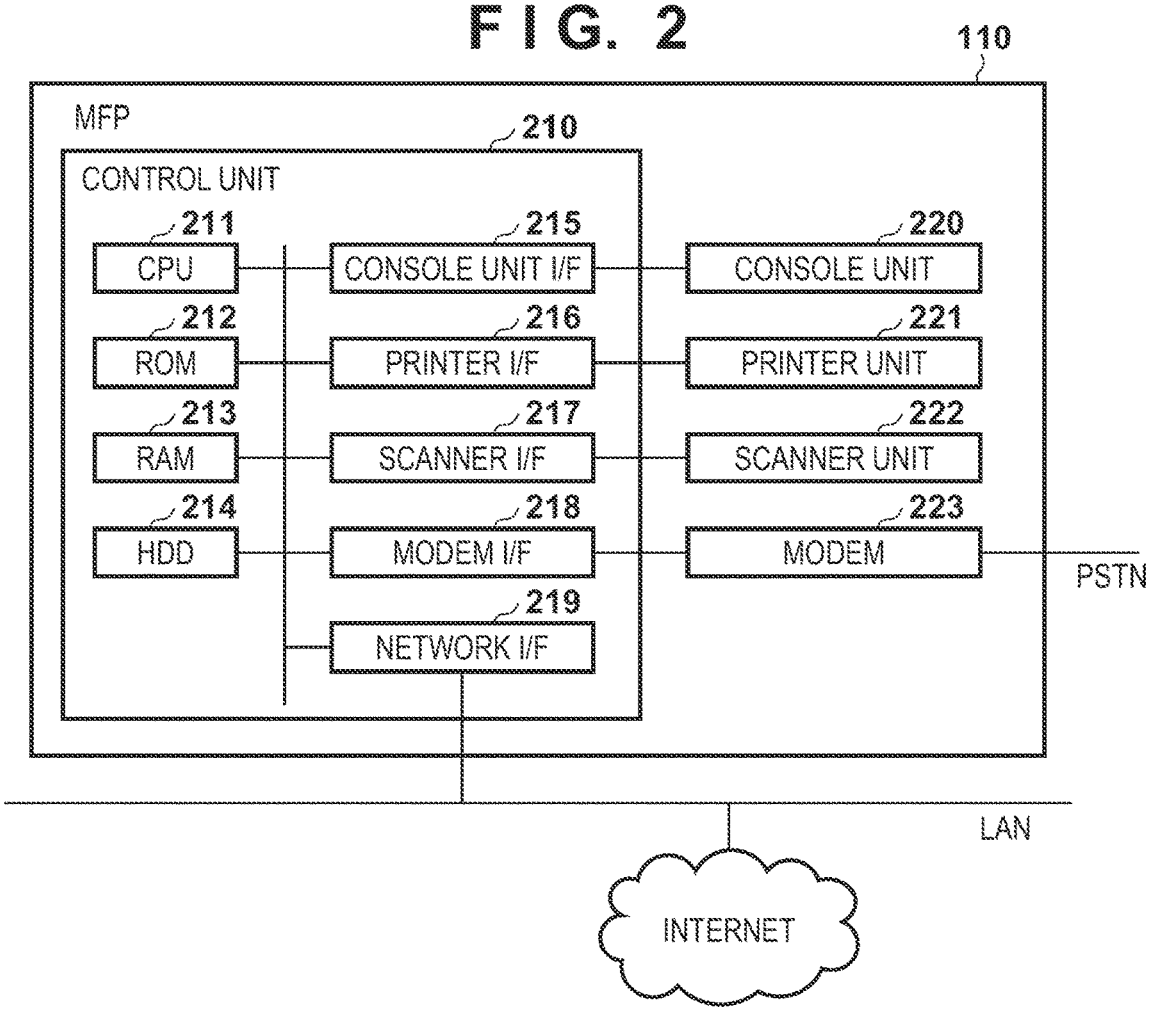
FIG. 2 is a block diagram for describing the hardware configuration of an MFP according to this embodiment.

FIG. 2 is a block diagram for describing the hardware configuration of the MFP 110 according to this embodiment.

The MFP 110 includes a control unit 210, a console unit 220, a printer unit 221, a scanner unit 222, and a modem 223. The control unit 210 includes the units 211 to 219 described below and controls all of the operations of the MFP 110. The CPU 211 controls the deploying of control programs stored in the ROM 212 on the RAM 213 and executing of the deployed control programs to execute various functions of the MFP 110, such as reading, printing, and communicating. The RAM 213 is used as a temporary storage area, for example, the main memory of the CPU 211, a working area, and the like. Note that in this embodiment, the single CPU 211 uses a single memory (the RAM 213, the ROM 212, or hard disk drive (HDD) 214) to execute the processing described in the flowchart described below. However, the present invention is not limited thereto. For example, a plurality of CPUs and a plurality of RAMS or HDDs may cooperate to execute the processing. The HDD 214 is a large capacity storage unit that stores image data and various programs. Note that instead of an HDD, an SD memory or the like may be used. The console unit I/F 215 is an interface that connects the console unit 220 and the control unit 210. The console unit 220 is provided with a touch panel, a keyboard, or the like and receives operations, inputs, and instructions from a user. The printer I/F 216 is an interface that connects the printer unit 221 and the control unit 210. Image data for printing is transferred from the control unit 210 to the printer unit 221 via the printer I/F 216 and is printed on a printing medium such as a sheet or paper by the printer unit 221. The scanner I/F 217 is an interface that connects the scanner unit 222 and the control unit 210. The scanner unit 222 optically reads a document set on a not-illustrated platen or auto document feeder (ADF) and generates image data, with the image data then being input to the control unit 210 via the scanner I/F 217. The MFP 110 is capable of print outputting (copying) the image data generated by the scanner unit 222 from the printer unit 221, as well as transmitting a file or transmitting by email. The modem I/F 218 is an interface that connects the modem 223 and the control unit 210. The modem 223 performs facsimile communication of image data between facsimile apparatuses on a public switched telephone network (PSTN). The network I/F 219 is an interface that connects the control unit 210 (MFP 110) to the LAN. The MFP 110 transmits image data and information to the services on the Internet and receives various types of information using the network I/F 219.

Figure 3:
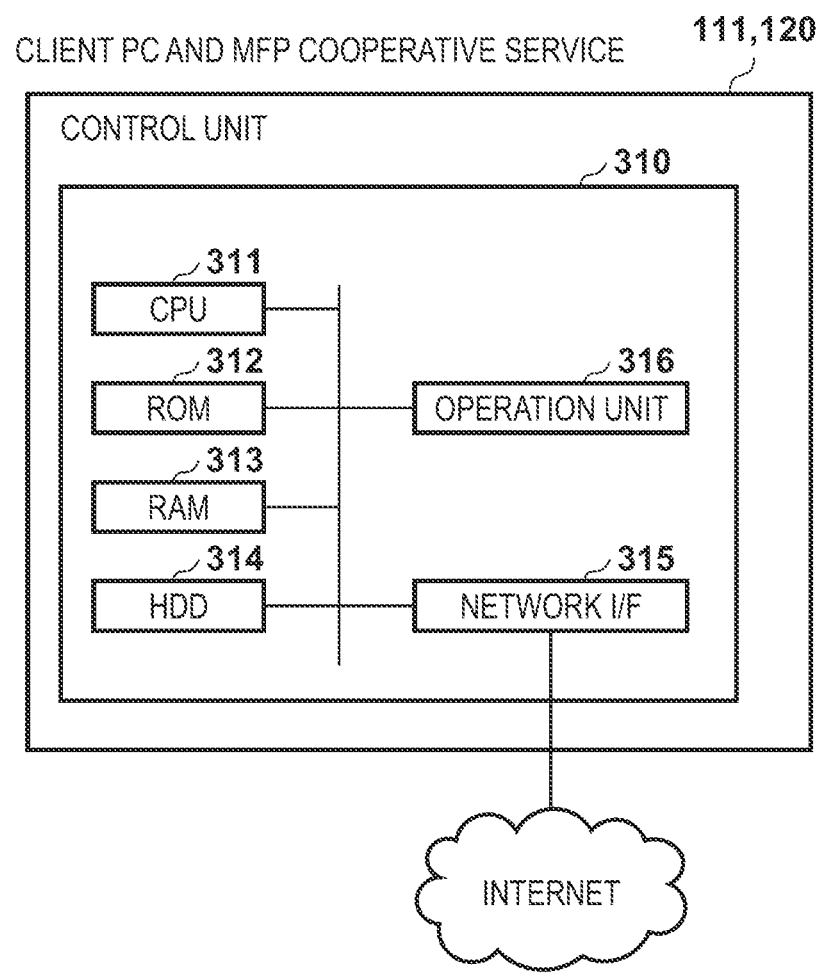
FIG. 3 is a block diagram for describing the hardware configuration of a client PC and an MFP cooperative service according to this embodiment.

FIG. 3 is a block diagram for describing the hardware configuration of the client PC 111 and the MFP cooperative service 120 according to this embodiment. Here, the client PC 111 and the MFP cooperative service 120 have a similar hardware configuration, and thus only the one block diagram illustrated in FIG. 3 will be used in the description.

The client PC 111 and the MFP cooperative service 120 include a control unit 310 including a CPU 311, a ROM 312, a RAM 313, a HDD 314, a network I/F 315, and an operation unit 316. The CPU 311 controls all of the PC 111 or the server by executing a boot program stored in the ROM 312 and deploying a program stored in the HDD 314 on the RAM 313 and executing the deployed control program in the RAM 313. The RAM 313 is used as a temporary storage area, for example, the main memory of the CPU 311, a working area, and the like. The HDD 314 is a large capacity storage unit that stores image data and various programs.

The network I/F 315 is an interface that connects the client PC 111, or the MFP cooperative service 120 to the Internet. The MFP cooperative service 120 and the cloud storage 130 receive processing requests from other apparatuses (for example, the MFP 110) and transmits and receives various types of the information via the network I/F 315. The operation unit 316 includes a display with a touch panel function, a keyboard, a pointing device, or the like and receives an operation from the user and sends this to the CPU 311.

Figure 4:
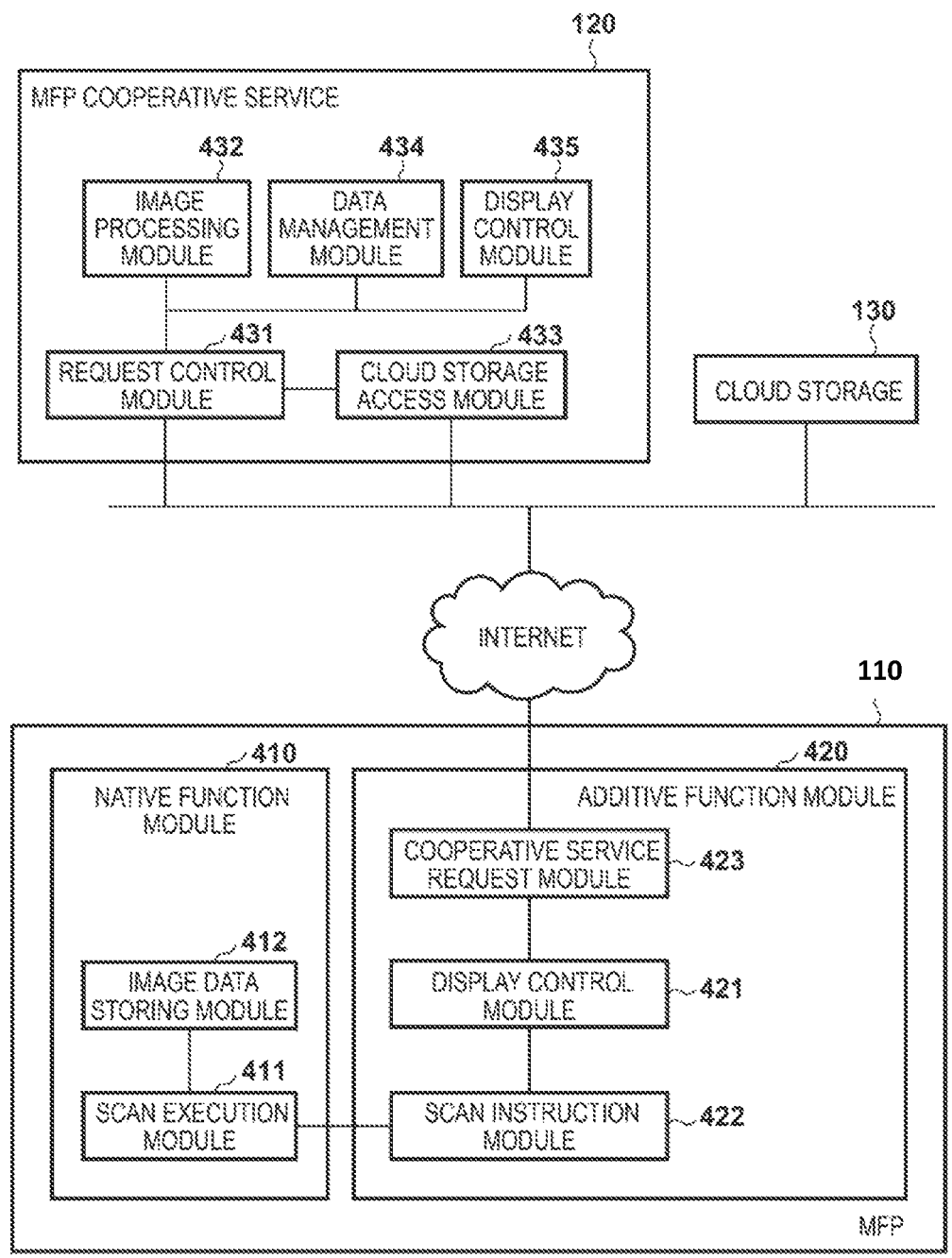
FIG. 4 is a functional block diagram for describing the software configuration of the image processing system according to this embodiment.

FIG. 4 is a functional block diagram for describing the software configuration of the image processing system according to this embodiment.

The MFP 110 is split mainly into two modules, a native function module 410 and an additive function module 420. The functions of these function modules are implemented by the CPU 211 deploying a program stored on the ROM 212 or the HDD 214 of the MFP 110 on the RAM 213 and executing the program. The modules included in the native function module 410 are provided standard in the MFP 110, but the additive function module 420 is achieved via an application additionally installed in the MFP 110. The additive function module 420 is an application based on Java (registered trademark) and can easily implement additional functions to the MFP 110. Note that in the MFP 110, other not-illustrated additional applications may be installed.

The native function module 410 includes a scan execution module 411 and an image data storing module 412. The additive function module 420 includes a display control module 421, a scan instruction module 422, and a cooperative service request module 423.

The display control module 421 displays the user interface (UI) screen for receiving a user operation via a display unit with a touch panel function of the console unit 220 of the MFP 110. For example, authentication information input for accessing the MFP cooperative service 120, scan settings, an operation screen for receiving a scan start operation, and the like may be displayed. The scan instruction module 422 requests the scan execution module 411 for scan processing using scan settings in accordance with the user instruction input via the UI screen.

The scan execution module 411 receives a scan request including the scan settings from the scan instruction module 422. The scan execution module 411, in accordance with the scan request, generates scanned image data by reading the document conveyed to or placed on the document platen glass using the scanner unit 222 via the scanner I/F 217. The scanned image data generated in this manner is sent to the image data storing module 412 and stored there. The scan execution module 411 sends an image identifier that uniquely represents the scanned image data stored in the image data storing module 412 to the scan instruction module 422. The image identifier includes numbers, symbols, alphabet characters, and the like for uniquely identifying the image data obtained by scanning with the MFP 110 (not illustrated). The image data storing module 412 stores the scanned image data received from the scan execution module 411 in the HDD 214. In this manner, the scan instruction module 422 obtains, from the image data storing module 412, the scanned image data corresponding to the image identifier received from the scan execution module 411. Also, the scan instruction module 422 outputs an instruction to process the scanned image data to the cooperative service request module 423, sending a request for this processing to the MFP cooperative service 120.

The cooperative service request module 423 sends requests for various types of processing to the MFP cooperative service 120. For example, login requests, scanned image data analysis requests, and the like are sent. Here, for the communication with the MFP cooperative service 120, representational state transfer (REST), simple object access protocol (SOAP), or another similar protocol is used, but other communication methods may be used.

Next, the functions of the MFP cooperative service 120 will be described.

The MFP cooperative service 120 includes a request control module 431, an image processing module 432, a cloud storage access module 433, a data management module 434, and a display control module 435.

The request control module 431 is in a standby state able to receive a request from an external apparatus. Also, when a request is received, the request control module 431 instructs the image processing module 432, the cloud storage access module 433, and the data management module 434 as appropriate depending on the request. For example, when a login request is received from the MFP 110, login processing is executed.

The image processing module 432 executes, on the image data, recognition processing, image data editing processing, and the like, including image data character region analysis, optical character recognition (OCR), similar business form determination (the processing of step S516 of FIG. 5 described below), image rotation and skew correction.

The cloud storage access module 433 transmits a processing request to the cloud service that provides the function (storage service) of the cloud storage 130. The cloud service has open various interfaces for storing files in cloud storage, acquiring stored files from an external apparatus, and the like, using typical protocol such as REST or SOAP. The cloud storage access module 433 uses the open interfaces of the cloud storage 130 to operate the cloud storage 130.

The data management module 434 holds user information, various types of setting data, and the like managed by the MFP cooperative service 120.

The display control module 435 receives a request from the web browser running on a terminal (not illustrated) of a PC, mobile phone, or the like connected via the Internet and replies with screen configuration information (HTML, CSS, or the like) required for screen display. The user confirms the user information registered in the MFP cooperative service 120 via the screen displayed on the web browser, may change the settings when scanning, and the like. Note that in the example configuration illustrated in FIG. 4, the additive function module 420 is installed in the MFP 110, however the present invention is not limited to this configuration. For example, the function of the additive function module 420 may be included in the client PC 111.

Figure 5:
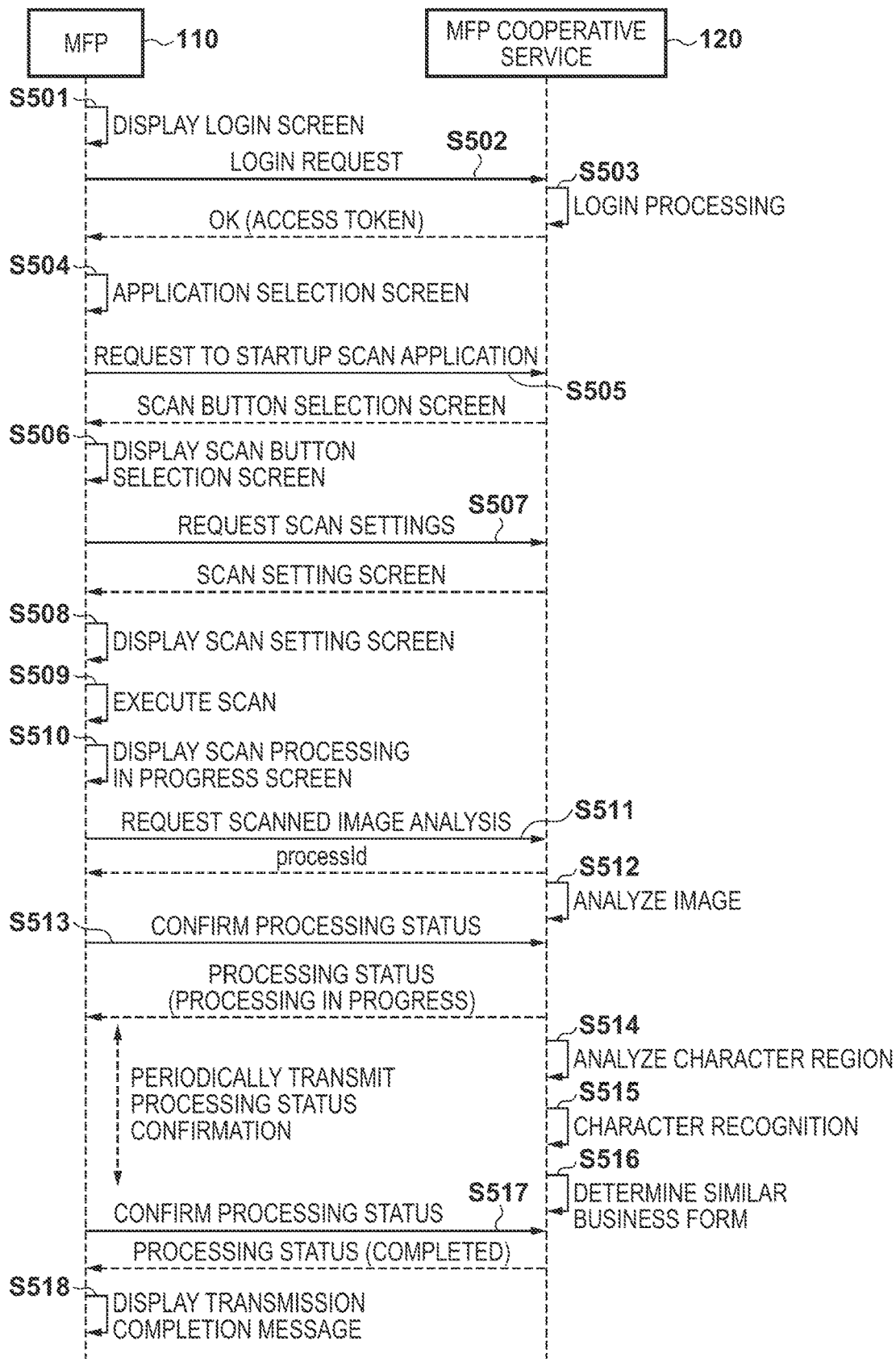
FIG. 5 is a sequence diagram for describing the flow of the processing between apparatuses when scanned image data obtained by scanning via the MFP of this embodiment is converted to a file and transmitted to cloud storage.

FIG. 5 is a sequence diagram for describing the flow of the processing between the MFP 110 and the MFP cooperative service 120 when the scanned image data obtained by scanning via the MFP 110 of this embodiment is converted to a file and transmitted to the cloud storage 130. Illustrated in FIG. 5 is a sequence of the user using a scan application via the MFP 110 to scan a business form and the business form data being transmitted to the MFP cooperative service 120. In the following description, the exchanges between the apparatuses will be focused on.

At the start of the processing of FIG. 5, the MFP 110 displays a main screen with buttons for executing the various functions provided on the touch panel of the console unit 220. Here, when an additional application (hereinafter, referred to as a scan application) for transmitting the business form data obtained by scanning to the cloud storage 130 is installed on the MFP 110, a button to use the function of the application is displayed on the main screen of the MFP 110. When this button is pressed, the screen required for transmitting the business form data obtained by scanning to the MFP cooperative service 120 is displayed.

In step S501, the MFP 110 displays a login screen (not illustrated) for entering authentication information for accessing the MFP cooperative service 120. Then in step S502, when the user enters the user name and password required for login via the login screen, the MFP 110 transmits a login request to the MFP cooperative service 120. Accordingly, in step S503, the MFP cooperative service 120 verifies whether the user name and the password included in the login request are correct and, if correct, replies to the MFP 110 with an access token. Thereafter, each type of request from the MFP 110 to the MFP cooperative service 120 includes this access token, with the user for whom the processing is being executed being able to be identified by this information. The user authentication method used may be a typically known method (Basic authentication, Digest authentication, authentication using OAuth, or the like).

When the login processing is complete, in step S504, the MFP 110 displays a usable application on the main screen (not illustrated). Here, when the user presses the button of the scan application on the main screen, in step S505, a request to start up the scan application is transmitted from the MFP 110 to the MFP cooperative service 120. Accordingly, the MFP cooperative service 120 obtains, from the HDD 314 of the MFP cooperative service 120, information required for displaying a scan button selection screen for selecting scan processing able to be used by the logged-in user and transmits this to the MFP 110. In this manner, in step S506, the MFP 110 displays the scan button selection screen illustrated in FIG. 7A on the basis of the information received from the MFP cooperative service 120.

Figure 7A:
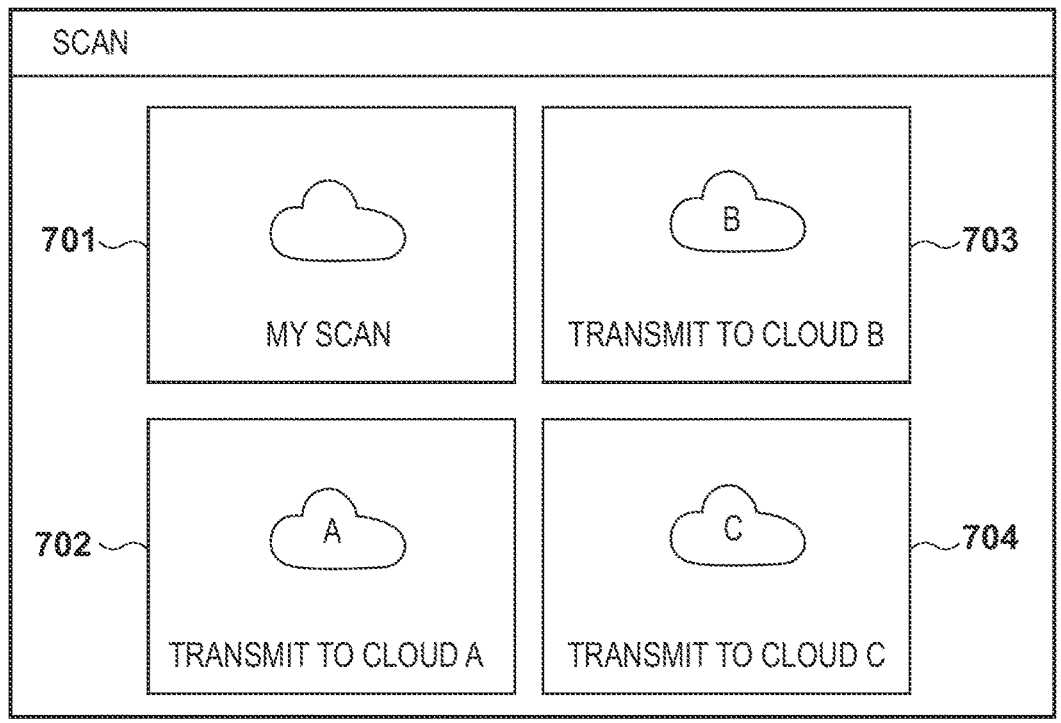
FIG. 7A is a diagram illustrating an example of a scan button selection screen displayed by the MFP according to this embodiment.

FIG. 7A is a diagram illustrating an example of the scan button selection screen displayed by the MFP 110 according to this embodiment.

Buttons 701 to 704 of FIG. 7A indicate buttons able to be used by the logged-in user, from among the scan buttons registered in the MFP cooperative service 120. There are two types of scan buttons. One type of scan button is the button 701 (hereinafter, a no-setting button) for setting settings, such as the destination cloud service or destination folder of data obtained by scanning, output settings, file name, and the like, from the client PC 111. The other type of scan button include the buttons 702, 703, and 704 (hereinafter, with-setting button) for which the destination cloud service, scan settings, and the like are set in the MFP cooperative service 120 in advance. To display these with-setting buttons 702 to 704, the user or administrator of the MFP 110 needs in advance to register a required number of a required combination of settings in the MFP cooperative service 120. Because the button 701 does not need to be preset in the MFP cooperative service 120, a single button is displayed to the user. Accordingly, even in a case where the administrator or the like has not registered a button with the MFP cooperative service 120 in advance, the function of the scan application can be used by a logged-in user via the button 701. Also, irrespective of whether or not the user is an administrator, the user can specify the settings required for them after scanning. This embodiment will be described in detail using an example in which thereafter the user uses the button 701 with no settings.

Here, when the user selects the button 701, in step S507, a request for the scan settings set by default for the no-setting button 701 is sent to the MFP cooperative service 120 by the MFP 110. The MFP cooperative service 120, in response to the request for the scan settings, obtains the default scan settings of the button 701 and the information required to display the scan setting screen from the HDD 314 of the MFP cooperative service 120 and transmits these to the MFP 110.

Figure 7B:
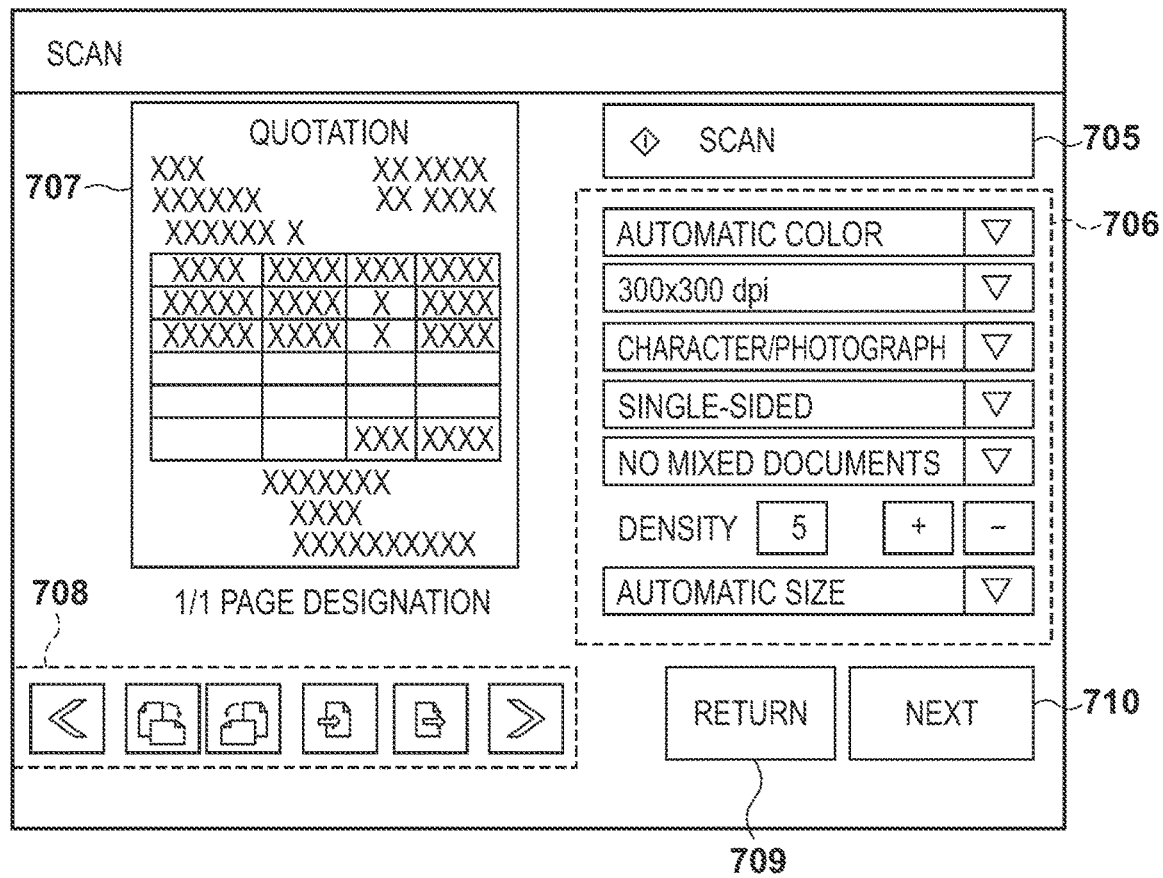
FIG. 7B is a diagram illustrating an example of a default scan setting screen displayed by the MFP according to this embodiment.

Then, in step S508, the MFP 110 displays the received information on the scan setting screen of FIG. 7B.

FIG. 7B is a diagram illustrating an example of the default scan setting screen displayed by the MFP 110 according to this embodiment.

A scan button 705 is a button for issuing an instruction to execute scanning. A region 706 is a region for receiving changes to the scan settings which include color, resolution, image quality, double-sided printing, mixed size documents, density, document size, and the like. A preview display 707 is where a preview of the scanned document is displayed. An area 708 includes buttons indicating page feed of the displayed preview, page rotation, page deletion, and page addition (additional scan). A return button 709 is a button for returning to the selection screen for the scan buttons. The user sets various scan settings relating to reading on the screen illustrated in FIG. 7B, places the paper form to be scanned on the platen glass or the ADF, and presses the scan button 705. In this manner, in step S509 of FIG. 5, the MFP 110 performs scanning and generates business form data digitized from the paper form.

A next button 710 in FIG. 7B is a button for proceeding to the next processing of the data obtained by scanning. When the next button 710 is pressed, in step S510 of FIG. 5, the MFP 110 displays the scan processing in progress screen. Then, in step S511, the MFP 110 transmits the image data generated via the scan processing of step S509 and the analysis request of the scanned image data to the MFP cooperative service 120.

Here, the scanned image data received by the MFP cooperative service 120 is held in the HDD 314 of the MFP cooperative service 120 until it is transmitted to the cloud storage 130. When the MFP cooperative service 120 receives a scanned image analysis request from the MFP 110, in step S512, the image processing module 432 of the MFP cooperative service 120 start analyzing the scanned image data. After then, the MFP 110 periodically transmits a confirmation of processing status of the MFP cooperative service 120 in step S513. The MFP cooperative service 120 responds to the MFP 110 with 'processID', which is an identifier uniquely representing the analysis requested for the MFP cooperative service 120 without waiting for a completion of the analysis of the scanned image data.

In the image analysis processing, in step S514, the MFP cooperative service 120 first analyzes the character regions in the scanned image data and, then in step S515, executes character recognition processing on all of the character regions. Then, in step S516, using layout information of the character region in the business form, the layout information of the image previously scanned by the logged-in user in step S503 and the layout information of the image data just scanned are compared and whether or not the scanned image data has a similar character region layout is determined. This processing is referred to as similar form determination. In the similar form determination, in a case in which the target scanned image data is similar to previous scanned image data, the MFP cooperative service 120 assigns the target scanned image data with information indicating the setting information set for the similar image data and stores this in the HDD 314 of the MFP cooperative service 120. However, in a case in which the scanned image data is not similar, the MFP cooperative service 120 stores the information of the character regions for the entire scanned image data and information indicating that there are no similar image data. The information of previous scanned image data used in determination is associated with a user, stored, and accumulated via the processing of steps S617 and S621 described below with reference to FIG. 6. Note that the processing of steps S514 to S516 of FIG. 5 will be described below in detail with reference to FIGS. 14A and 14B.

In step S517, the MFP 110 uses the 'processID' received as a response for step S511 and confirms the processing status of the analysis of the scanned image data corresponding to the 'processID' with the MFP cooperative service 120 periodically (every hundreds of milliseconds or several milliseconds, for example). Note that, though omitted from FIG. 5, the processing of step S517 is continuously executing until a response indicating image processing completion (completion of the analysis) is obtained from the MFP cooperative service 120. When a request for processing status confirmation is received in step S517 by the MFP cooperative service 120, the state of the processing corresponding to the 'processID' is confirmed and a response is sent.

Here, a character string indicating the current processing status is stored in the 'status' of the response. For example, when the 'status' is 'processing', this means that the processing executed by the MFP cooperative service 120 is in progress, and when the 'status' is 'completed', this means that the processing is in a completed state. Note that in a case in which the processing fails, another status such as 'failed' may be returned.

In this manner, in step S517, when the MFP 110 detects the completion of the processing, in step S518, the MFP 110 displays a message indicating that scanning is complete on the console unit 220 of the MFP 110 and returns to the display of the scan setting screen of step S508. In a case in which there are a plurality of business forms to be scanned at this time, the plurality of business forms can be repeatedly scanned (the processing of steps S508 to S518 repeatedly executed). Also, by issuing an instruction for a setting to divide the documents using a fixed number of pages or interleaving before scanning, a plurality of types of business forms can be collectively scanned once and divided into respective types of business forms.

After step S518, the user sets transmission settings including destination cloud storage of business form data obtained by scanning, destination folder, output settings, file name, metadata, and the like and executes processing to transmit these to the cloud storage 130 using the client PC 111. Note that though not illustrated, when the MFP cooperative service 120 is accessed from the client PC 111, as with the MFP 110, login processing is executed, and the user executes processing on the scanned business form data scanned by the user.

Next, processing including the user operating the client PC 111, viewing and operating the business form data transmitted to the MFP cooperative service 120 using the client PC 111, and transmitting this to the cloud storage 130 will be described with reference to FIG. 6.

FIG. 6 is a sequence diagram of the business form data transmitted to the MFP cooperative service 120 according to this embodiment being viewed and operated using the client PC 111 and this being transmitted to the cloud storage 130. For FIG. 6 also, in the following description, the exchanges between the apparatuses will be focused on.

In step S601, the client PC 111 obtains, from the MFP cooperative service 120, a screen of a list of scanned business form data for confirming the list of business form data obtained by scanning and displays this.

FIG. 8A is a diagram illustrating an example of a case of performing new transmission settings for unlearned scanned business form data using the screen of a list of scanned business form data displayed on the client PC 111 according to this embodiment.

Reference numerals 801 to 803 represent business form data scanned by the user with the MFP 110. An area 804 is an area where information (hereinafter, referred to as job properties) set for the scanned business form data selected on the screen of a list of scanned business form data is displayed. A button 805 is a button for displaying a screen for setting the destination cloud storage. A button 806 is a button for displaying a screen for setting the destination folder in the cloud storage, i.e., the destination, after the destination cloud storage is set using the button 805. A button 807 is a button for displaying a screen for setting the output settings such as the file format when storing the business form data in the cloud storage. A button 808 is a button for displaying a screen for setting the file name of the file to be stored. A button 809 is a button for storing the setting after the required settings have been completed or transmitting the scanned business form data to the set destination. Depending on the details of the settings, the name of the button 809 switches between 'save' and 'send'. The button 809 is displayed disabled in a case in which the required settings have not been set for storage or transmission. In FIG. 8A, 'save' is displayed.

A send button 810 is a button for issuing an instruction to transmit the scanned business form data. An edit button 811 is a button for displaying an editing screen. The editing screen is a screen for selecting and inputting a character string in the preview image of the scanned business form data and is used for folder rules and file name rules described below and when using a character string (OCR character string) in the scanned image data for metadata. This, in a case in which settings have not been completed or there are no properties using an OCR character string, this is displayed disabled. A delete button 812 is a button for deleting the selected scanned business form data. An update button 813 is a list update button that is active when there are scanned business form data not yet displayed in the MFP cooperative service 120. By pressing the update button 813, the scanned list screen is updated. By using the update button 813 a required number of times, all of the scanned business form data currently held in the MFP cooperative service 120 can be displayed. A tag 814 is a tag that is displayed in a case in which it is determined that the scanned business form data has no similar forms via similar form determination. Here, because there are no similar forms for the business form data corresponding to the business form data 801, 'unlearned' is displayed indicating that there is no learned data. In FIG. 8A, the scanned business form data of business form data 801 is selected, and job properties 804 for the scanned business form data of the selected business form data 801 is displayed. Also, as the tag 814, an 'unlearned' tag is attached. This means that the user has not yet scanned a business form similar to the business form indicated by the business form data 801.

FIG. 8B illustrates a screen for selecting whether to appropriate the transmission settings set for another existing scanned business form data or set new transmission settings for a scanned business form data without a similar business form (unlearned). A button 815 is a button for setting new transmission settings. When the button 815 is selected, the screen of FIG. 8A described above is displayed. A button 816 is a button for appropriating the transmission settings set by another existing scanned business form data. When the button 816 is selected, the transmission setting list screen of FIG. 9A is displayed.

FIG. 9A is a diagram illustrating an example of the screen of a list of transmission settings displayed when existing transmission settings are appropriated.

A list 917 displays a list of transmission settings for learned scanned business form data set previously by a user. A cancel button 918 is a button for canceling settings appropriation and returning to the screen of FIG. 8B. An OK button 919 is a button for confirming appropriation of the transmission settings selected in the list 917. When an unlearned business form is selected from the list of scanned business form data, whether or not the screen for selecting the transmission settings appropriation of FIG. 8B is displayed is determined by whether or not there is business form data previously learned via the user. Also, in a case in which the scanned business form data is not unlearned and the business form data is similar to previously learned business form data, the settings of the job properties 804 reflect the settings previously set by the user for the similar business form data.

The operations of first setting new transmission settings for an unlearned scanned business form data on the screen of FIG. 8B and storing this as learning data on the screen of FIG. 8A will now be described.

In a case in which there is no business form data previously learned via the user or the new setting button 815 is selected on the screen of FIG. 8B, the initial values are displayed for the setting buttons of the job properties 804 of the unlearned scanned business form data as illustrated in FIG. 8A. In FIG. 8A, the destination cloud service is not set, the destination folder is not set, the output setting is set to cloud compression PDF, and the file name is not set, with the initial values displayed. Accordingly, the no-setting button 701 of FIG. 7A can be pressed and the transmission settings, such as the destination cloud storage and the like, can be set one by one after the fact for unlearned business form data from among business form data obtained by scanning.

First, the user uses the client PC 111 and presses the destination button 805 of FIG. 8A to transmit the destination editing processing of step S602 to the MFP cooperative service 120. Also, the client PC 111 receives the screen information from the MFP cooperative service 120 and displays the destination setting screen of FIG. 9B.

FIG. 9B is a diagram illustrating an example of the destination setting screen displayed by the client PC 111 according to this embodiment.

In an area 901, scanned business form data information is displayed to show the scanned business form data targeted for settings. In an area 902, the cloud storages 130 which are able to be selected as the destination are displayed. A save button 903 is a button for saving the selected cloud storage 130 as the destination. When the user selects one of the cloud storages from the area 902 and clicks the save button 903, in step S603, the selected destination information is transmitted from the client PC 111 to the MFP cooperative service 120. Then, in step S604, the MFP cooperative service 120 confirms whether or not the user can access the selected cloud storage 130. In a case in which the authentication information required for the user to access the cloud storage 130 is stored in the MFP cooperative service 120, the MFP cooperative service 120 stores the selected cloud storage 130 as the destination of the scanned business form data. However, in a case in which the user authentication information is not stored in the MFP cooperative service 120, a display indicating that authentication for the cloud storage 130 is required is displayed. Then, the login screen for the cloud storage 130 is displayed and, if the user logs in, the authentication information required for connecting to the cloud storage 130 is stored in the MFP cooperative service 120. After the connection between the client PC 111 and the cloud storage 130 is confirmed, the MFP cooperative service 120 stores the selected cloud storage 130 as the destination for the scanned business form data. Then, when the destination storage of step S605 is complete, the screen of a list of the scanned business form data of FIG. 8A is displayed by the client PC 111 with updated information of the cloud storage of the set destination.

Figure 12:
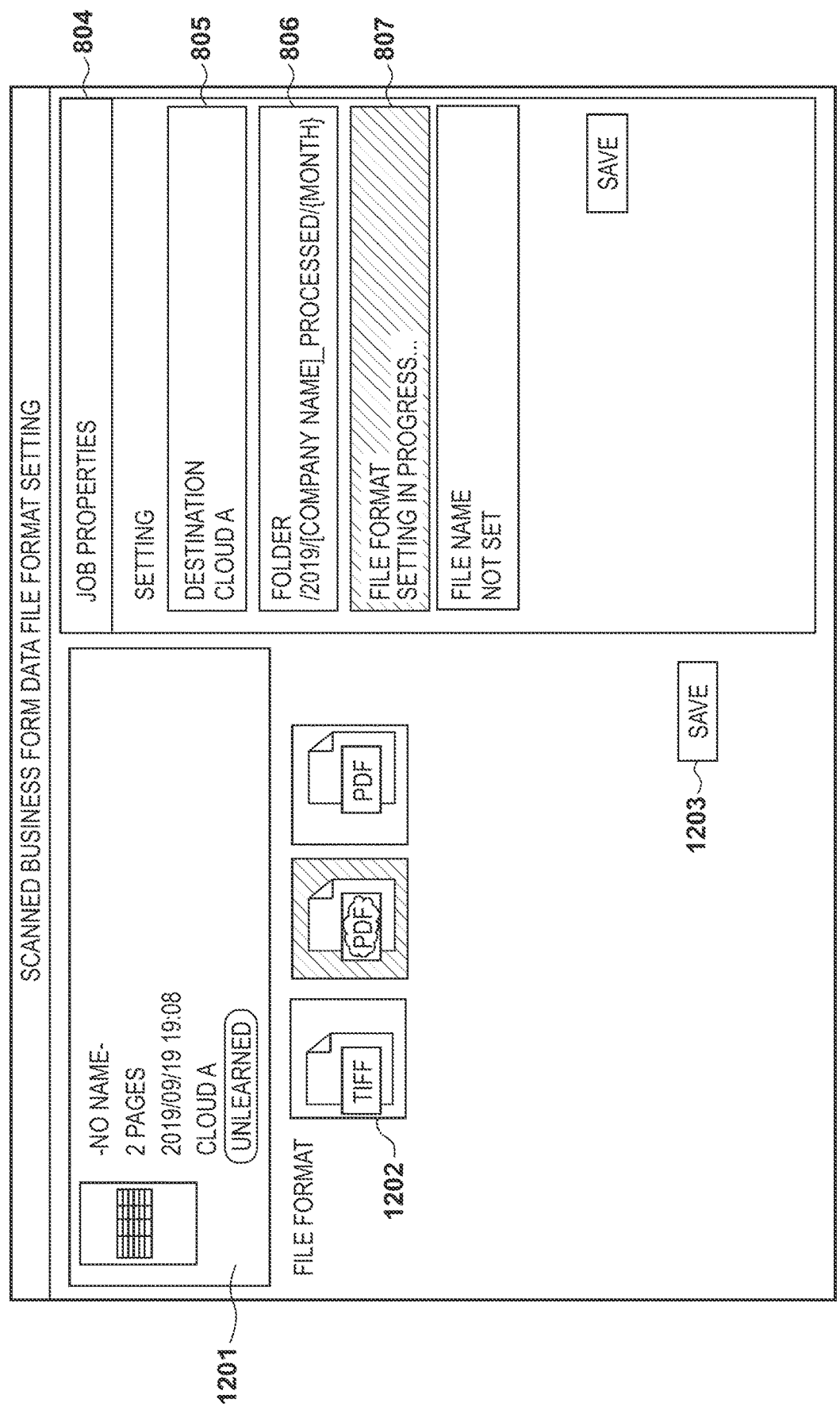
FIG. 12 is a diagram illustrating an example of the setting screen for the file format of the scanned business form data displayed by the client PC according to this embodiment.

Though not illustrated in FIG. 8A, the set destination is reflect in the set destination of the business form data 801 and the destination button 805 as illustrated in FIG. 12, for example. When setting the destination using the destination button 805 is complete, the destination folder setting of the button 806 changes from a disabled state to an enabled state. Then, when the user clicks the button 806, in step S606, a request for the editing screen of the destination folder is transmitted from the client PC 111 to the MFP cooperative service 120. Accordingly, in step S607, the MFP cooperative service 120 uses the authentication information of the user for the cloud storage 130 to obtain the folder information from the cloud storage 130. Then, the MFP cooperative service 120 transmits the editing screen for the destination folder displaying the obtained folder information to the client PC 111, and this screen is displayed by the client PC 111.

FIG. 10A is a diagram illustrating an example of the setting screen for the destination folder displayed by the client PC 111 according to this embodiment.

In area 1001, as with the area 901 of FIG. 9B, the scanned business form data for editing is displayed. A preview 1002 is where the path of the selected destination folder is displayed as a preview. In area 1003, the folder information obtained from the cloud storage 130 is displayed in a tree view or the like. The user indicates a folder displayed in the area 1003 and selects the destination folder. A setting button 1004 is a button for setting the folder rules for allocating the folder selected in the area 1003 a starting point. A save button 1005 is a button for saving the selected folder as the destination folder.

When the user indicates the folder in the area 1003 and selects the setting button 1004, the folder rule setting screen of FIG. 10B is displayed.

FIG. 10B is a diagram illustrating an example of the setting screen for the folder rules displayed by the client PC 111 according to this embodiment.

An area 1006 for configuring folder rules include items 1007 to 1009. The item 1007 is scan information. This is used in a case in which the name of the user, the device name, the date and time, and the like of the scan is allocated and used for the rules. The item 1008 is a fixed character string. This is used in a case in which a discretionary character string is used in allocation. A new button 1010 is a button for creating a new fixed character string. When the new button 1010 is clicked, the screen of FIG. 11A is displayed and a character string can be input via the screen.

FIG. 11A is a diagram illustrating an example of the fixed character string creation screen displayed by the client PC 111 according to this embodiment.

An area 1116 is a fixed character string input area. In this example, a state in which the character string 'processed' has been input by the user is illustrated. A cancel button 1117 is a button for canceling character input on this screen, and an OK button 1118 is a button for confirming the fixed characters input on this screen.

The character string created in this manner is displayed in a fixed character string display area 1011 of FIG. 10B and can be used in the folder rules. The item 1009 is an OCR character string. This is used in a case in which a character string at a specific location in the scanned business form data is used. A new button 1012 is a button for creating an extraction field for an OCR character string. When the new button 1012 is selected, the OCR character string new selection screen of FIG. 11B is displayed. A cancel button 1014 is a button for canceling setting of the folder rules and closing the screen. An enter button 1015 is a button for creating the folder rules in accordance with settings entered via the setting screen.

FIG. 11B is a diagram illustrating an example of the OCR character string new selection screen displayed by the client PC 111 according to this embodiment.

Note that though not illustrated in FIG. 6, information including a preview image, OCR character string region coordinates, and the like is obtained from the MFP cooperative service 120 when the new button 1012 is pressed. A preview 1119 is a preview of the scanned business form data. An area 1120 includes an OCR character string selected by the user. A button 1121 is a button for canceling the OCR character string selection. An area 1122 is an area displaying a preview of the area 1120 of the selected OCR character string. An area 1123 is an area for entering the name of an extraction field for an OCR character string. By specifying a field name, what kind of character string is selected can be easily known when using the same rules for another business form data. A cancel button 1124 is a button for canceling the OCR selection on the screen and closing the screen. An OK button 1125 is a button for confirming the OCR character string selection on the screen and creating an OCR character string item. In this example, a state is illustrated in which the company name in the area 1120 of the scanned business form data has been selected as an OCR character string item. The created OCR character string is displayed in the OCR character string display area of an area 1013 of FIG. 10B. Next, the method of creating folder rules will be simply described.

The area 1006 for configuring folder rules can be used to define rules with a plurality of hierarchies. What item is inserted at what hierarchy changes depending on the row selected in the area 1006 for configuring folder rules. FIG. 10B illustrates a state in which the second hierarchy (second row) of the area 1006 for configuring folder rules is selected. In this state, when 'month' of the scan information of the item 1007 is clicked, the item 'month' is inserted at this hierarchy. Also, the items 1007 to 1009 can be inserted by dragging and dropping the items on this row. In this example, the OCR character string 'company name' and the fixed character string 'underscore' and 'completed' are placed in the first hierarchy of the folder name, and the scan information 'month' is placed in the second hierarchy. Here, the closing brackets [ ] indicated that the character string can be substituted by an OCR character string, and the quotes { } indicate that the variable can be substituted from the scanned information. The OCR character string and variable change depending on the scanned business form data, and thus the file of the scanned business form data can be allocated in accordance with the set rules.

Then, when the save button 1005 is pressed, in step S608, the destination folder information selected by the user is transmitted to the MFP cooperative service 120. Accordingly, in step S609, the MFP cooperative service 120 stores the received destination folder information as the destination folder of the scanned business form data. Then, the MFP cooperative service 120 transmits the screen with the updated destination folder to the client PC 111. Accordingly, as illustrated in FIG. 12 for example, the client PC 111 displays the screen with the updated root folder button 806 on the screen of a list of the scanned business form data of FIG. 8A.

Next, when the user clicks the file format button 807, in step S610, a request for the output setting editing screen is transmitted to the MFP cooperative service 120. Accordingly, the MFP cooperative service 120 transmits the output setting editing screen to the client PC 111, and the screen is displayed by the client PC 111.

FIG. 12 is a diagram illustrating an example of the setting screen for the file format of the scanned business form data displayed by the client PC 111 according to this embodiment.

In area 1201, as with the area 901 of FIG. 9B and the area 1001 of FIG. 10A, the information relating to the scanned business form data for editing is displayed. In an area 1202, the selectable output settings are displayed. In this example, the save file format is displayed, and cloud compression PDF is selected as the initial value. When the user selects the output setting from the area 1202 and clicks a save button 1203, in step S611, the output setting information selected by the user is transmitted to the MFP cooperative service 120. In step S612, the MFP cooperative service 120 stores the received output setting information as the output settings of the scanned business form data and transmits the information required for the updated screen to the client PC 111. Accordingly, the client PC 111 updates the file format button 807 on the screen of a list of the scanned business form data of FIG. 8A and displays the screen with the updated output settings.

Next, when the user clicks on the file name edit button 808 of FIG. 8A, in step S613, a request for the file name editing screen is transmitted from the client PC 111 to the MFP cooperative service 120. Accordingly, the MFP cooperative service 120 transmits the file name editing screen to the client PC 111, and the screen is displayed by the client PC 111.

FIG. 13 is a diagram illustrating an example of the file name editing screen displayed by the client PC 111 according to this embodiment.

In area 1301, as with the area 901 of FIG. 9B, the area 1001 of FIG. 10A, and the area 1201 of FIG. 12, the information relating to the scanned business form data for editing is displayed. An area 1302 is an area for configuring the file name rules. However, in contrast to the area 1006 for configuring the folder rules of FIG. 10B, only one row is displayed with no hierarchy. Areas 1303 to 1305, new button 1306 and 1308, and areas 1307 and 1309 are the same items as the areas 1007 to 1013 of FIG. 10B, thus description thereof is omitted. These items can be used to set to rules of the file name. A save button 1310 is a button for saving the set file name. As illustrated in the fixed character string display area 1307 and the OCR character string display area 1309 of FIG. 13, an item created when settings the rules for the folder name can be appropriated in the same settings. Note that in FIG. 13, a state is illustrated in which 'document name' for a field name OCR character string has been added to the file name rules. The illustrated state is a combination of OCR character string 'document name' and 'company name', fixed character string 'underscore', and scan information 'year', 'month', 'day' for the file name rules. Then, when the user clicks the save button 1310, in step S614, the information of the selected file name is transmitted from the client PC 111 to the MFP cooperative service 120. Next, in step S615, the MFP cooperative service 120 stores the file name of the selected scanned business form data. Thereafter, when the user clicks the save button 809, in step S616, the transmission setting information is transmitted from the client PC 111 to the MFP cooperative service 120.

Accordingly, in step S617, the MFP cooperative service 120 associates together and stores the destination, destination folder, output settings, file name, character region used in the folder rules and file name rules, and similar setting information set up until now and a formID (details described below) uniquely representing the type of the scanned business form data and the user information. In other words, as illustrated in FIGS. 16A and 16B, a setting information management table 1601 (details described below) is generated or updated. The timing of when the setting information is stored may be when the user sets the settings including the destination and file name. Here, user information is also associated with the other information because it is expected that there are cases in which the file name and destination for storage is different for different users.

The setting information including the formID and the user information associated together and stored are automatically assigned on the basis of the current stored setting information in a case in which it is determined that the next business form data is the same type. This removes the time and effort involved in setting the same settings a number of times when the same user uses the same type of business form data. Also, when the setting information is stored in step S615, in a case in which formID information which is the same as that of the current business form data to be stored is already stored in the MFP cooperative service 120, the information of the transmission settings associated with this formID is overwritten with the current stored information. At this time, the user may be asked each time to confirm whether or not to overwrite the information.

Also, in the case of a cloud storage 130 which has metadata including the set destination, in step S618, the MFP cooperative service 120 sends an obtaining request for the metadata to the cloud storage 130. Accordingly, the cloud storage 130 transmits the metadata with the set destination folder to the MFP cooperative service 120. Then, the MFP cooperative service 120 transmits screen information for displaying the confirmed transmission information and metadata to the client PC 111. The client PC 111 then displays the obtained screen information in the job properties area 804.

FIG. 14A depicts a view illustrating an example of the screen of a list of the scanned business form data displayed by the client PC 111 according to this embodiment, and in this example, the confirmed transmission information and metadata information are displayed in the job properties area.

Here, the display of the button 809 has switched from 'save' to 'send'. In area 1401, instead of the buttons 805 to 808 of FIG. 8A, the display has switched to displaying the corresponding setting values. This is to stop the user from easily changing the destination or the like after the transmission settings have been confirmed. A button 1402 for changing the settings is the button pressed to edit the transmission settings. When the button 1402 for changing the settings is pressed, again the setting buttons 805 to 808 as displayed as illustrated in FIG. 8A and these items can be set. At this time, the display of the button 809 changes back from 'send' to 'save'.

Attribute 1403 displays the attribute value including the OCR character string or cloud storage metadata used in the transmission settings. In this example, in areas 1404 and 1405, the attribute values (company name and document name in this example) of the OCR character string used in the transmission settings are displayed, and in area 1406, the date is displayed as the cloud storage metadata. In the case of an OCR character string, the field name is displayed in an area 1407, and an image of the selected OCR character string is displayed in an area 1408. An image of an OCR character string in area 1408 can be selected by clicking or the like, and when selected, a preview is again opened and the OCR character string can be re-selected. In an area 1409, text of the OCR result of the selected character string is displayed. By comparing the image of the OCR character string in the area 1408 and the OCR result in the area 1409, the user can check whether there is a mistake in the OCR result. An edit button 1410 is a button for selecting to edit in a case in which there is a mistake in the OCR result of the area 1409. When the edit button 1410 is selected, the OCR result of the area 1409 switches to an editable state in which the text can be edited using a keyboard or the like. An area 1411 displays the date metadata, and in the illustrated example, the processing date is automatically entered as metadata. The type of the metadata depends on the cloud storage 130 and thus is not limited to the metadata of this example. Also, in a case in which the metadata is text or a numerical value, so that it can be selected from an OCR character string, the display may be similar to that of the area 1404. A button 1412 is a button for editing the date, and when the button 1412 is selected, a calendar is displayed and the date can be changed. Then, when the send button 809 is selected, in step S619, the client PC 111 executes processing to transmit the data for transmission.

Accordingly, in step S620, the MFP cooperative service 120 creates a file in accordance with the set output settings and the file name. Next, in step S621, in a case in which settings have been changed, the MFP cooperative service 120 associates together the formID and the user information and stores the change. At this time, whether or not to overwrite may be made to be selected. Also, in the case of not overwriting, a name is input and stored as new setting information. Then, in step S622, the MFP cooperative service 120 assigns the input metadata to the created file and transmits this to the set destination cloud storage and the destination folder. Accordingly, when transmission is complete, the MFP cooperative service 120 notifies the client PC 111 that transmission is complete. The client PC 111 then notifies the user that transmission is complete. Accordingly, the scanned business form data for which transmission is complete is deleted from the screen of a list of the scanned business form data.

Next, a case in which the button 816 is used to select the appropriation of existing settings for an unlearned scanned business form data will be described with reference to FIG. 8B.

In a case in which the button 816 for instructing for appropriation of existing settings is pressed, as illustrated in FIG. 9A, the screen of a list of transmission settings including user information and types of business forms previously associated together and stored is displayed.

The user selects the settings to appropriate from the list 917 of transmission settings of FIG. 9A. In the list 917, the name, destination, folder, file name, and file format settings previously assigned to the transmission settings by the user of the client PC 111 are displayed. At this time, to make it clear which settings where used for which type of business form, the file name of the file previously transmitted and an image thereof may be displayed. The details will be described below. The cancel button 918 is a button for canceling the settings of the screen and returning to the screen of FIG. 8B. The OK button 919 is a button for confirming as a setting the appropriation of the settings selected in the transmission setting list 917. Note that the information of the list 917 may be transmitted from the MFP cooperative service 120 to the client PC 111 in response to a request for the screen of a list of the scanned business form data of step S601. Alternatively, when the button 816 for instructing for the appropriation of existing settings is clicked, a request (not illustrated) for a list of the transmission settings of the client PC 111 may be received and the list may be transmitted from the MFP cooperative service 120 to the client PC 111.

When the user selects the transmission settings to appropriated from the screen of FIG. 9A and presses the OK button 919, step S616 is executed, and in step S617, the current formID is associated with the selected transmission settings and stored. Thereafter, the selected setting screen information is transmitted from the MFP cooperative service 120 to the client PC 111. Then, the client PC 111 displays the screen of FIG. 14B.

Figure 14B:
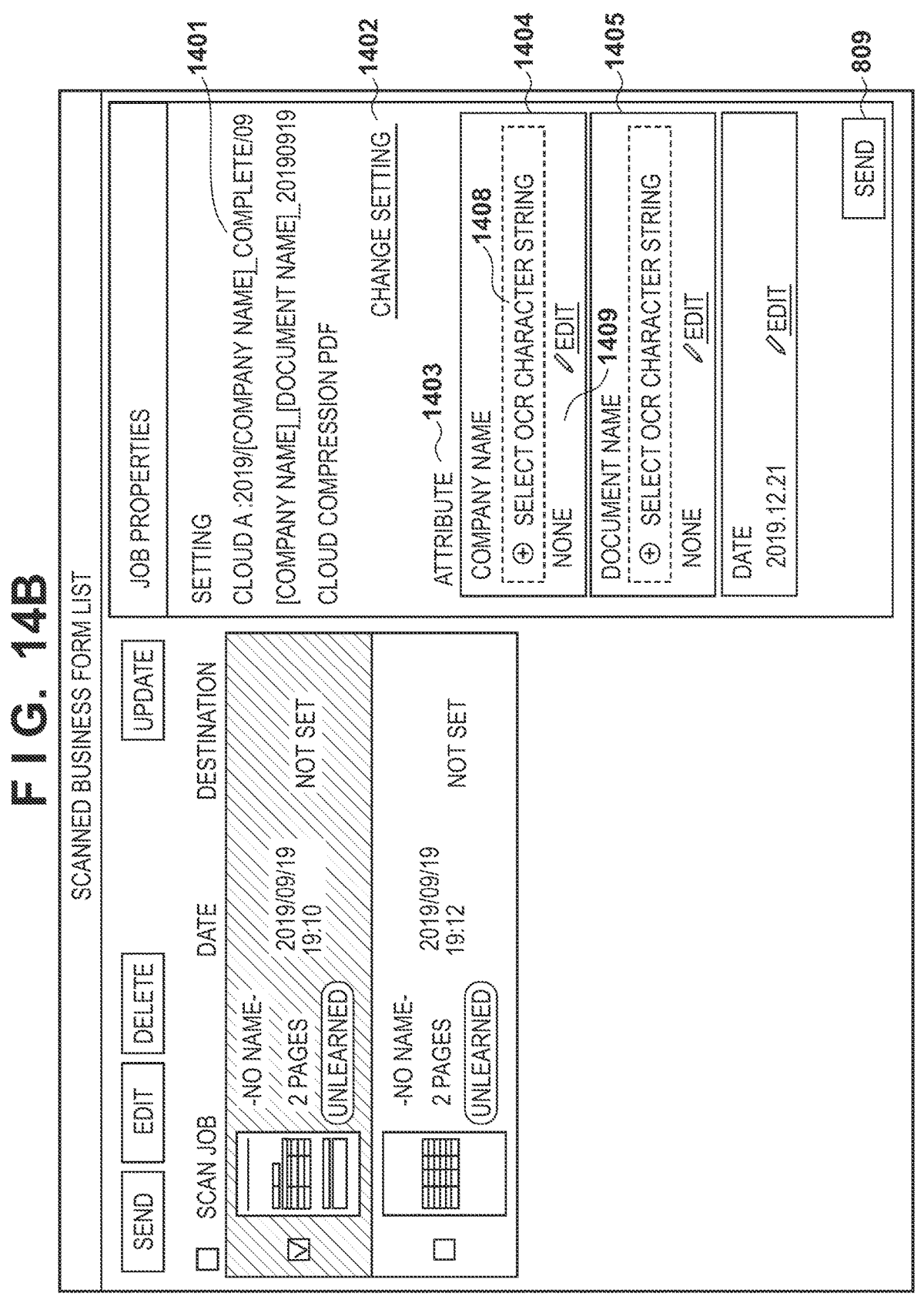

FIG. 14B depicts a view illustrating an example of the screen of a list of scanned business form data displayed by the client PC 111 according to this embodiment. In this example, the scanned business form data corresponding to the business form data 801 described above with its transmission completed via the screen of FIG. 12A is deleted from the screen of a list of scanned business form data.

As illustrated in FIG. 14B, the coordinate position of the OCR character string selected for the transmission settings included in the learned data previously stored is not important to reflect in a case in which the type of business form is different and is thus not reflected here. Accordingly, the OCR image of the area 1408 displays a non-selected state, and the OCR result of the area 1409 displays 'no data'. In the area 1401, because there is no OCR character string, the field names 'company name' and 'document name' are displayed instead. Here, by the user selecting 'select OCR character string' of the area 1408, the user can select an OCR character string from the displayed screen of FIG. 15.

FIG. 15 is a diagram illustrating an example of a screen displayed by the client PC 111 according to this embodiment when selecting a character string to be used as the company name for the file name of the scanned business form data.

An image, character region, or OCR character string of the scanned business form data may be transmitted from the MFP cooperative service 120 when the OCR image display area 1408 is clicked, or may be transmitted when the transmission setting information to be transmitted in step S616 is confirmed. A preview image 1513 is a preview image of the unlearned scanned business form data. In an area 1514, a selected OCR character string is displayed. The screen of this example is an example of a screen when the user clicks the character string 'invoice' after the screen of FIG. 15 is displayed. A button 1515 is a button for canceling the OCR character string selection. In the screen of FIG. 15, there are two attributes displayed in the areas 1404 and 1405 as attributes to be inputted with an OCR character string, with the user deciding which attribute to assign the selected OCR character string to. In FIG. 15, the area 1404 is in a selected state, meaning that the OCR character string selected next will be allocated to the area 1404. A save button 1516 is a button for confirming the OCR character string selected on this screen. Thereafter, when the user clicks the send button 809, the processing of steps S619 to S622 of FIG. 6 is executed, the learned data of the type of the current scanned business form data is stored, and then the file of the current scanned business form data is transmitted to the cloud storage 130.

By appropriating the transmission settings set for a previous business form for a user and a type of business form in this manner, the time and effort involved in setting the settings is reduced. Also, because the formID of a new scanned business form data is associated with the same transmission settings and stored, when the settings are changed, the change is applied to all of the business form data associated with the same settings. The processing will be described in detail below.

FIGS. 16A and 16B are diagrams illustrating an example of the setting information management table 1601 according to this embodiment.

The setting information management table 1601 is a table holding the transmission setting information set by the user for the scanned business form associated with the user information and the type of business form and is held by the data management module 434 of the MFP cooperative service 120. Rows 1602 to 1609 represent transmission setting information held for each user. Reference numeral 1610 represents the table management number. User 1611 represents the user. Name 1612 represents the name assigned to the transmission settings by the user. Destination 1613 represents the cloud storage 130 set as the destination by the user. Root folder 1614 represents the root folder of the cloud storage 130 set by the user. Folder rules 1615 represents the folder rules set by the user. The type (OCR character string, scan information, or the like) of the item used in the settings and combinations thereof are held in the folder rules. File name rules 1616 represents the file name rules set by the user. As in the folder rules 1615, the type of the item used in the settings and combinations thereof are held in the file name rules 1616. File format 1617 represents the held file format. Metadata 1618 holds the attribute name and type (text, numerical value, or the like) of metadata in a case in which an OCR character string is used. In a case in which the processing date and the like are automatically input, because it is no necessary to store this, the metadata 1618 is not held in the management table. A formID 1619 represents an ID uniquely representing the type of business form scanned by the user. In OCR 1620, the coordinates (x, y) and the region information (width, height) of the OCR character string input in the OCR character string field in a case in which an OCR character string is used in the folder rules 1615, the file name rules 1616, and the metadata 1618 are held.

Next, an example of the transmission settings held for user A will be described with reference to FIGS. 16A and 16B.

In FIGS. 16A and 16B, the transmission settings held for the user A correspond to the four rows 1602 to 1605. This corresponds to the settings displayed in the transmission setting list described using FIG. 9A. In the row 1602, two formIDs are associated, meaning that there are two types of business forms that use the same transmission settings. In a similar manner, in the row 1603, there is one type, in the row 1604, there are three types, and in the row 1605, there are two types of business forms associated. In a case in which the user A has selected 'purchase order' for the row 1602 in the transmission setting list of FIG. 9A for unlearned scanned business form data, the learned data dependent on the business form data of the metadata 1618 and the OCR 1620 is ignored, and the setting information of the destination 1613 to the file format 1617 is appropriated. At this time, a formID uniquely representing the unlearned business form data is newly associated with the row 1602. The OCR character string region information is blank as it has not yet been specified. Accordingly, a state in which the OCR character string is not set is displayed, as described above with reference to FIG. 14B. Thereafter, when the user specifies the character region of each OCR character string in the screen of FIG. 15 and clicks the send button 809, the information of the specified character region is stored in the OCR 1620. Accordingly, the user can be made to select whether or not to share and use the same transmission settings for different types of business form data.

Next, a case in which the user scans a business form similar to one with the formID 'u3n4-azdt-48k8-ukci-5kpe' will be described. In this case, a screen such as that illustrated in FIG. 14A in which all of the information from the destination 1613 to the OCR 1620 of FIGS. 16A and 16B has been reflected is displayed. In other words, when a similar form is scanned, the transmission settings and the OCR character string listed in the setting information management table 1601 are configured to be constantly reflected. In a case in which, after a screen with reflected settings, such as that illustrated in FIG. 14A, is displayed, the user clicks on the button 1402 for changing the settings and further overwrites and saves changed content, the transmission settings associated with the formID which has been saved is overwritten. For example, in the case of changing and saving the transmission settings for formID 'u3n4-azdt-48k8-ukci-5kpe', formID 'cb2b-4asa-4cbe-bg8d-yjrr' also associated with the settings is also affected.

Because business form data sharing the same settings can be collectively changed with one change, no time and effort is needed to change the settings of each business form. Also, in a case in which the contents of the setting change are the addition of an OCR character string field or the like, for other business form data, the added information for the character region of the OCR character string is blank. Thus, next time, when similar scanned business form data is scanned, the blank information state of the character region of the OCR character string is displayed and the user selects an OCR character string on the screen of FIG. 15.

In the example described above, an overwrite save is performed after settings are changed. However, the user may be made to choose whether to overwrite or save as a separate transmission setting when the user presses the save button 809 (not illustrated). In a case in which the user chooses to save the change as a separate transmission setting, in the setting information management table 1601, the formID is deleted from the originally associated settings and a new transmission setting is added to the management table. Alternatively, when the user clicks the button 1402 for changing the settings of FIG. 14A, a screen for making the user select whether or not appropriate another setting and redo the settings may be output (not illustrated). In a case in which the user chooses to appropriate another setting and redo the settings, the screen of FIG. 9A is displayed again and the user is made to select the settings to appropriate. Thereafter, the formID of the changed business form is deleted from the original setting information management table 1601 and associated with the newly associated user transmission settings and saved. Which transmission settings to associate with is important, and thus, when displaying a list of the transmission settings on the screen of FIG. 9A, the determination by the user is facilitated by displaying what transmission settings were previously used with what type of business form data. For example, in a case in which a file name and an image of business form data previously associated with a formID of FIGS. 16A and 16B are each stored, for business form data using the same settings, the file name and the image can be displayed on the screen of FIG. 9A as an example. In this manner, the user can easily determine which business form data to use the same settings of for unlearned business form data.

Figure 17:
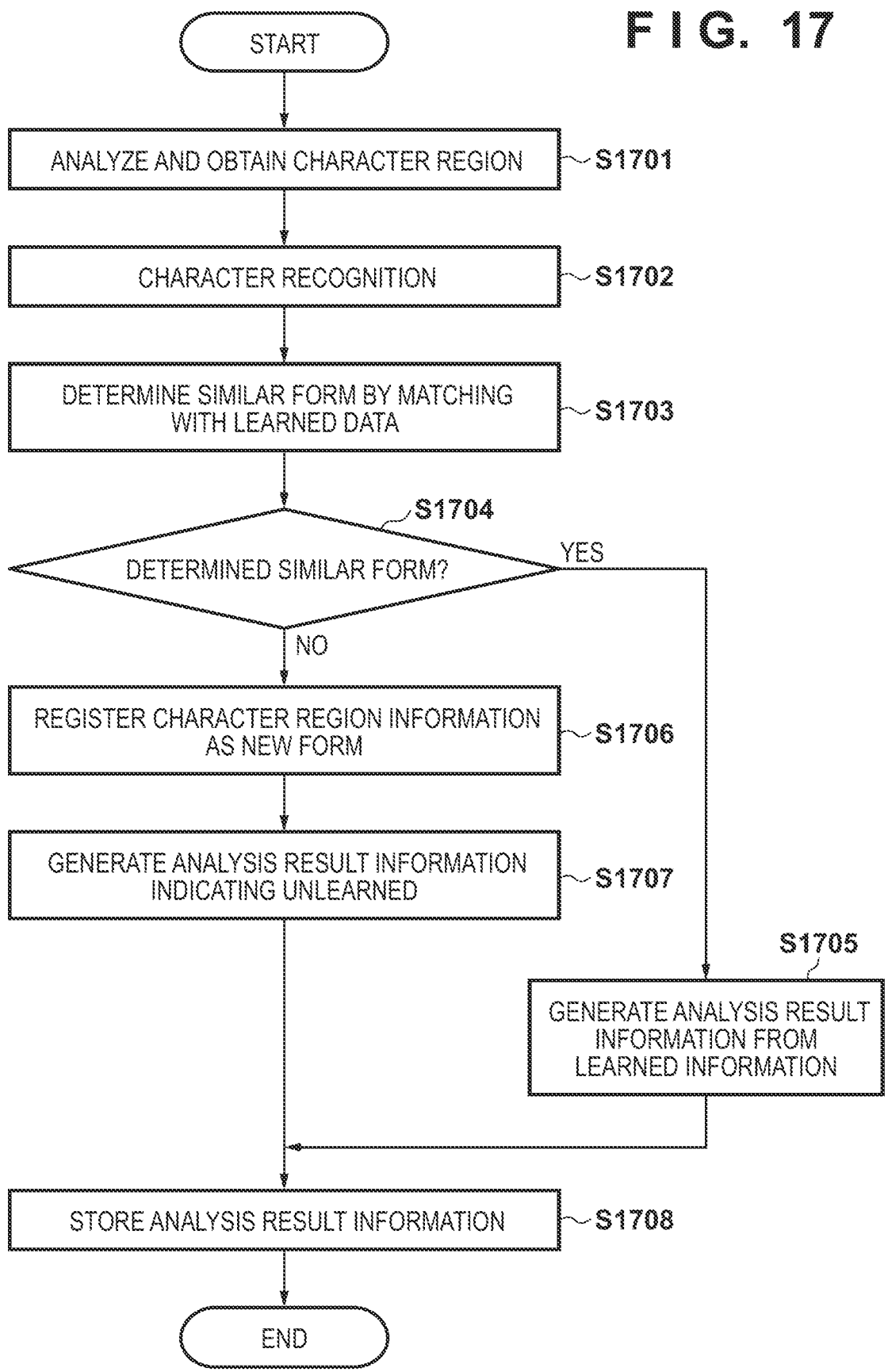
FIG. 17 is a flowchart for describing the image analysis processing executed by an image processing module of the MFP cooperative service according to this embodiment.

FIG. 17 is a flowchart for describing the image analysis processing executed by the image processing module 432 of the MFP cooperative service 120 according to this embodiment. The processing described in the flowchart is implemented by the CPU 311 deploying a program stored in the ROM 312 or the HDD 314 on the RAM 313 and executing the deployed program in the RAM 313 of the MFP cooperative service 120. The flowchart is for describing in detail the processing of steps S514 to S516 executed by the image processing module 432 after an image processing request has been received by the image processing module 432 of the MFP cooperative service 120 from the request control module 431 in step S512 of FIG. 5.

First in step S1701, the CPU 311 functions as the image processing module 432 and analyzes the character region of the business form image data obtained by scanning in step S509 and obtains a character region group of the business form data. Next, the process proceeds to step S1702, and the CPU 311 executes character recognition processing on all of the character string regions detected in the analysis of step S1701. Then, the process proceeds to step S1703, and the CPU 311 uses the information detected in step S1701 and step S1702 to determine whether or not there is a similar form. Similarity determination includes comparing the layout information of the image data obtained by a previous scan and the layout information of the image data obtained by the current scan, using the layout information of the character region and the like. In a case in which there is image data obtained by a previous scan with a similar character region layout, it is determined that there is a similar form. In other words, determination is perform for whether or not the transmission setting information of a formID which is the same as the formID of the currently analyzed business form data is held in the setting information management table 1601 of the MFP cooperative service 120.

In a case in which the result of the determination is that no similar business form data is found in step S1704, the process proceeds to step S1705. In step S1705, the CPU 311 generates analysis result information from the setting information (in other words, transmission setting information indicated in the setting information management table 1601 associated and saved with a formID in step S616 of FIG. 6) associated and saved with the similar form, and then the process proceeds to step S1708. The analysis result information is information relating to a character string in the image used in the transmission settings set for the similar form. Information of the character region used for the folder and file name and the metadata as the OCR character string in a similar form is obtained, a character region at a similar position is detected in the image data obtained by the current scan, and the character string in this region is obtained.

In a case in which a similar form is not found in step S1704, the process proceeds to step S1706. In step S1706, the CPU 311 newly registers the image data obtained by the current scan as new business form data (i.e., with no similar form). The registered information is used as one piece of business form information used to determine whether or not there is a similar form when the analysis processing of FIG. 17 is executed from the next time onward. Then, the process proceeds to step S1707 where the CPU 311 generates the analysis result information, and then the process proceeds to step S1708. Here, because there is no similar form, only information indicating that it is unlearned is generated. Then in step S1708, the CPU 311 stores the analysis result information generated in step S1705 or step S1707 in the HDD 314 of the MFP cooperative service 120.

Via this processing, when the scanned business form data is determined to be similar to business form data obtained by a previous scan, the information of a character region in an image used with the transmission settings associated with and saved for a similar form is obtained. Then, the character region is detected and a character string of the region is obtained, allowing the transmission settings of the scanned business form data to be obtained.

Next, the processing of, when the screen of a list of the scanned business form data for transmission is requested in step S601, the information required to display the screen of a list of the scanned business form data being obtained by the MFP cooperative service 120 and this being transmitted to the client PC 111 will be described.

Figure 18:
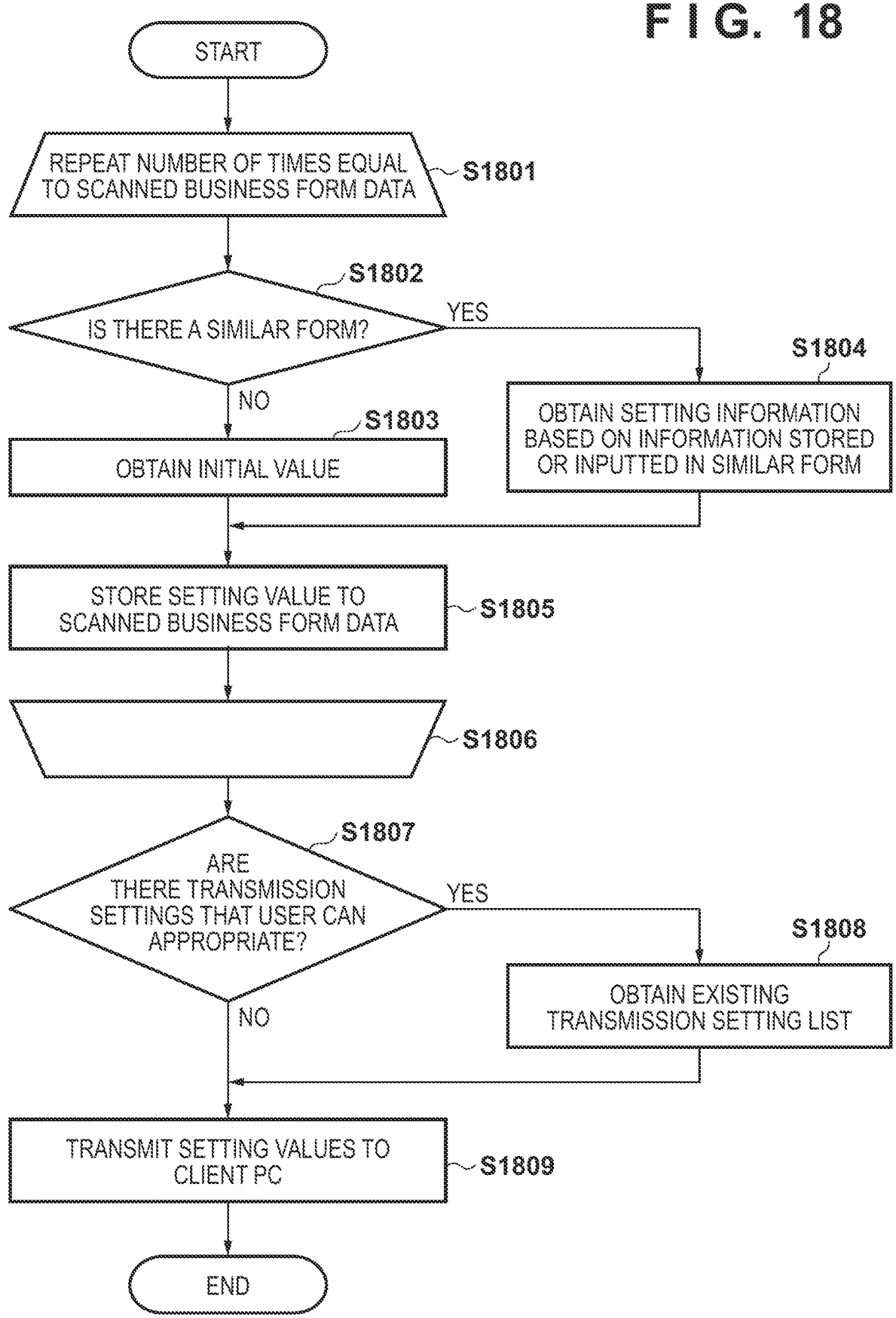
FIG. 18 is a flowchart for describing the processing of the MFP cooperative service according to this embodiment acquiring the information for displaying the screen of a list of the scanned business form data and transmitting this to the client PC.

FIG. 18 is a flowchart for describing the processing of the MFP cooperative service 120 according to this embodiment obtaining the information for displaying the screen of a list of the scanned business form data and transmitting this to the client PC 111. The processing indicated in the flowchart is implemented by the CPU 311 deploying a program stored in the ROM 312 or the HDD 314 on the RAM 313 and executing the deployed program. When an obtaining request for the screen of a list of the scanned business form data is received from the client PC 111 in step S601, the MFP cooperative service 120 references the list of the scanned business form data current held by the MFP cooperative service 120 and the analysis result information thereof. Here, information corresponding to the user information authenticated by the MFP cooperative service 120 is referenced.

First, as indicated in steps S1801 to S1806, this processing is repeated a number of times equal to the number of pieces of scanned business form data corresponding to the user information currently held by the MFP cooperative service 120. In step S1802, the CPU 311 functions as the display control module 435 and determines whether or not there is a similar form for the scanned business form data. Here, in a case in which there are no similar forms, in other words it is unlearned business form data, the process proceeds to step S1803 where the initial values of when there is a new setting are obtained, and then the process proceeds to step S1805. Next, in step S1805, the CPU 311 stores the initial values as the scanned business form data settings.

On the other hand, in a case in which it is determined that there is a similar form in step S1802, the process proceeds to step S1804 where the CPU 311 obtains the setting information from the analysis result information associated and stored with the similar form. The process the proceeds to step S1805 where the setting information is stored with the scanned business form data.

Though not illustrated in FIGS. 6 and 18, in a case in which there is an initial value of the cloud storage 130 for the metadata or information able to be referenced by the MFP cooperative service 120 is input separately, in step S1805, this information is stored as scanned business form data setting information. Note that in a case in which the cloud storage service 130 which is the connection destination cannot be accessed or there is no destination folder, the setting values are not stored and an error section may be output. Then, when the processing of steps S1801 to S1806 on all of the scanned business form data is complete, the process proceeds to step S1807.

In step S1807, the CPU 311 determines whether or not there are transmission settings that a user can appropriate. In other words, in a case in which, using the setting information management table 1601, it is determined whether or not there are transmission settings associated with the user information and there are such transmission settings, the process proceeds to step S1808. In step S1808, the CPU 311 obtains a list of the existing transmission settings, and the process proceeds to step S1809. On the other hand, in step S1807, when the CPU 311 determines that there are not transmission settings that can be appropriated by the user, the process proceeds to step S1809. In step S1809, the CPU 311 transmits information including stored setting values for the business form data to the client PC 111.

In a case in which, in the screen of a list of the scanned business form data, there is business form data similar to the scanned business form data, the client PC 111 can present the setting information set for the similar form.

Next, in a case in which the save button 809 for the screen of a list of the scanned business form data is clicked or in which the OK button 919 in the transmission setting list of FIG. 9A is clicked, the setting information of the scanned business form data is stored. In other words, the information in the setting information management table 1601 is update, and from the next time onward, the updated setting information is reflected in the similar scanned business form data.

Figure 19:
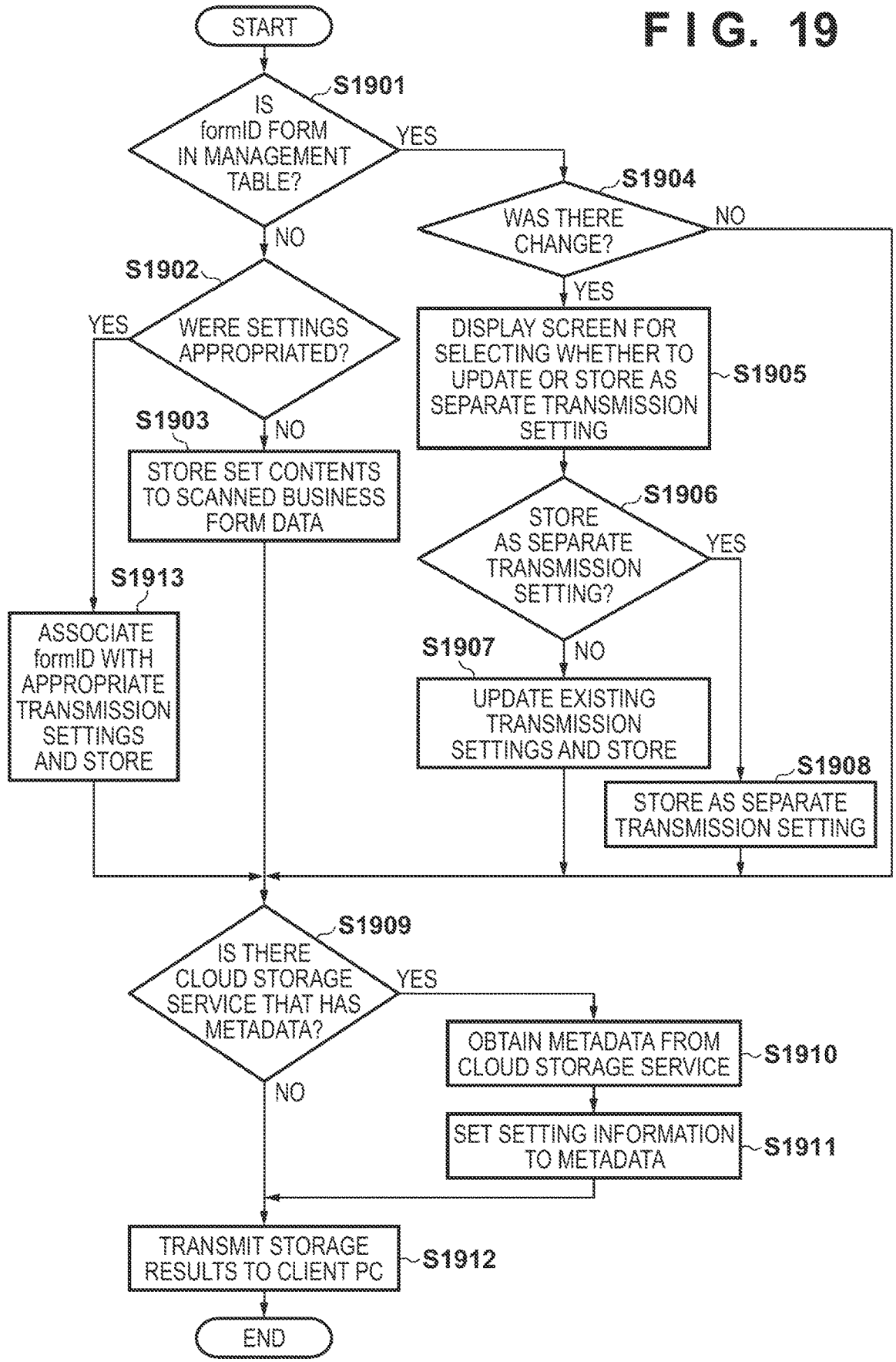
FIG. 19 is a flowchart for describing the processing of storing the setting information for scanned business form data by the MFP cooperative service according to this embodiment.

FIG. 19 is a flowchart for describing the processing of storing the setting information for scanned business form data by the MFP cooperative service 120 according to this embodiment. The processing indicated in the flowchart is implemented by the CPU 311 deploying executing a program stored in the ROM 312 or the HDD 314 on the RAM 313 and the deployed program.

When the save button 809 on the screen of a list of the scanned business form data is clicked, in step S1901, the CPU 311 determines whether or not the business form data is the same as a formID in the setting information management table 1601. Here, in a case in which the business form data does not have a formID in the setting information management table 1601, the process proceeds to step S1902, and the CPU 311 determines whether or not settings on the screen of FIG. 9A have been appropriated. Here, whether or not the settings have been appropriated may be determined by whether or not the OK button 919 has been pressed on the screen of FIG. 9A or whether or not the settings have been appropriated may be stored in the client PC 111 or the like. In a case in which it is determined that the settings have not been appropriated, the process proceeds to step S1903, and the CPU 311 associates the settings with the user information and a new formID and stores this is the setting information management table 1601 as new transmission setting information. The process then proceeds to step S1909.

In a case in which it is determined that the settings have been appropriated on the screen of FIG. 9A, the process proceeds to step S1913, and the CPU 311 associates a new formID with the appropriated transmission settings and stores this in the setting information management table 1601. The process then proceeds to step S1909.

On the other hand, in step S1901, in a case in which the CPU 311 determines that the business form is the same as a formID in the setting information management table 1601, the process proceeds to step S1904 where it is determined whether or not there has been a change from the existing transmission settings in the setting information management table 1601. In a case in which no change is determined in step S1904, storage processing is not executed and the process proceeds to step S1909.

In a case in which it is determined in step S1904 that the transmission settings have changed, the process proceeds to step S1905. In step S1905, the CPU 311 transmits a screen for confirming whether to overwrite and update the transmission settings or to newly store the transmission settings in the setting information management table 1601 to the client PC 111 and makes the user select. Then, the process proceeds to step S1906. In a case in which the user selects overwrite save on the client PC 111, the CPU 311 proceeds to step S1907 and overwrite saves the existing transmission settings associated with the current formID. The process then proceeds to step S1909. In a case in which in step S1906, the user selects to save the settings as separate transmission settings, the process proceeds to step S1908. The CPU 311 saves the settings as separate transmission settings, and the process proceeds to step S1909.

In step S1909, the CPU 311 determines whether the cloud storage 130 where storage was executed this time is a storage that includes metadata. In a case in which it is determined that there is no metadata, the process proceeds to step S1912, the storage result is transmitted to the client PC 111, and processing ends. In a case in which it is determined in step S1909 that the storage includes metadata, the process proceeds to step S1910 where the CPU 311 obtains the metadata from the cloud storage service 130. Then, the process proceeds to step S1911 where, in a case in which there is setting information to be set for the metadata, the CPU 311 sets the setting information to the metadata. This is updated in the case of the character region of the OCR character string being set or in the case a numerical value able to be automatically processed. Then, the process proceeds to step S1912 where the CPU 311 transmits the storage result to the client PC 111. Accordingly, the client PC 111 reflects the data received from the MFP cooperative service 120 and may display a screen such as that of FIG. 14A or 14B. Note that in a case in which the OK button 919 in the transmission setting list of FIG. 9A is pressed, a similar processing flow to a case in which there is no registered formID in the setting information management table 1601 in step S1901 is followed. Then, it is determined in step S1902 that the settings have been appropriated, and the process proceeds to step S1913 where processing is executed to associate the formID with the appropriated transmission settings and store them.

Next, processing by the MFP cooperative service 120 in a case in which the button 1402 for changing the settings of the destination cloud storage service and the destination folder is selected on the screen of FIGS. 14A and 14B will be described.

Figure 20:
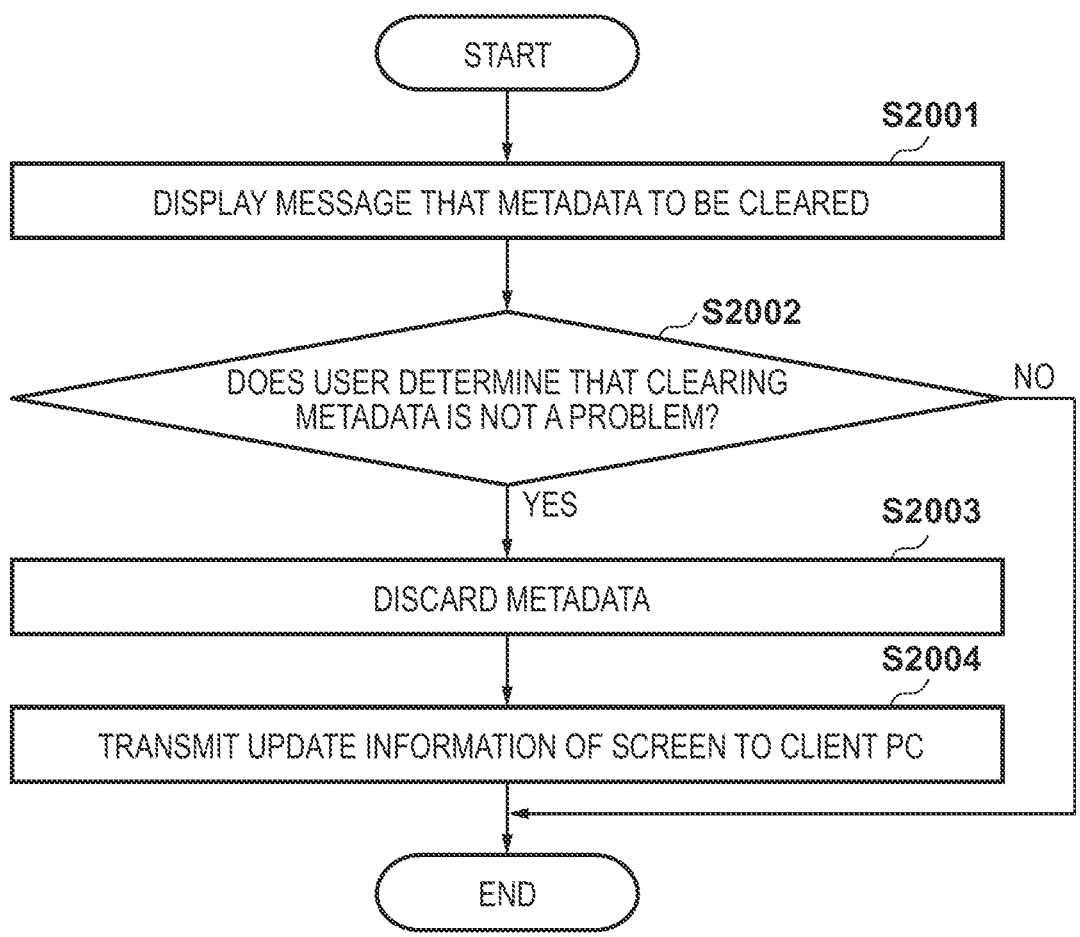
FIG. 20 is a flowchart for describing the processing by the MFP cooperative service according to this embodiment when a button for changing the settings on the screen of FIGS. 14A and 14B is pressed.

FIG. 20 is a flowchart for describing the processing by the MFP cooperative service 120 according to this embodiment when the button 1402 for changing the settings on the screen of FIGS. 14A and 14B is pressed. The processing indicated in the flowchart is implemented by the CPU 311 deploying a program stored in the ROM 312 or the HDD 314 on the RAM 313 and executing the deployed program.

When the button 1402 for changing the destination settings is pressed by the user, in step S2001, the CPU 311 causes the client PC 111 to display a message (not illustrated) for confirming that there is no problem with the metadata being cleared. Next, the process proceeds to step S2002 where the CPU 311 determines whether or not the user of the client PC 111 selected OK (not illustrated), or in other words whether or not the user is OK with the metadata being cleared. When the user is OK with the metadata being cleared, the process proceeds to step S2003 where the CPU 311 discards the set metadata. In other words, the metadata obtained from the cloud storage service 130 is deleted from the scanned business form data settings. Then, the process proceeds to step S2004 where the CPU 311 transmits the updated information for the screen to the client PC 111. Accordingly, when the client PC 111 receives the updated information for the screen, the screen is updated as follows. The display of the metadata is deleted from the job properties area 804 of FIG. 8A. Also, the display of the button 809 is changed from 'send' to 'save'. Furthermore, the display of the setting values of the setting information display area 1401 and the button 1402 for changing the settings of FIGS. 14A and 14B return to the buttons 805 to 808 of FIG. 8A. However, in step S2002, when it is determined that the user does not intend to clear the metadata, the processing ends as is.

Note that in step S2004, a screen for selecting whether or not to appropriate existing settings and change the settings may also be displayed (not illustrated). Then, in a case in which the user selects to appropriate the existing settings, the formID to be edited is deleted from the setting information management table 1601 and the list of the existing transmission settings of FIG. 9A is displayed. When the user selects the transmission settings to appropriate, as described with reference to FIG. 19, processing is executed that is the same as the processing executed when the OK button 919 is selected on the transmission setting list.

Figure 21:
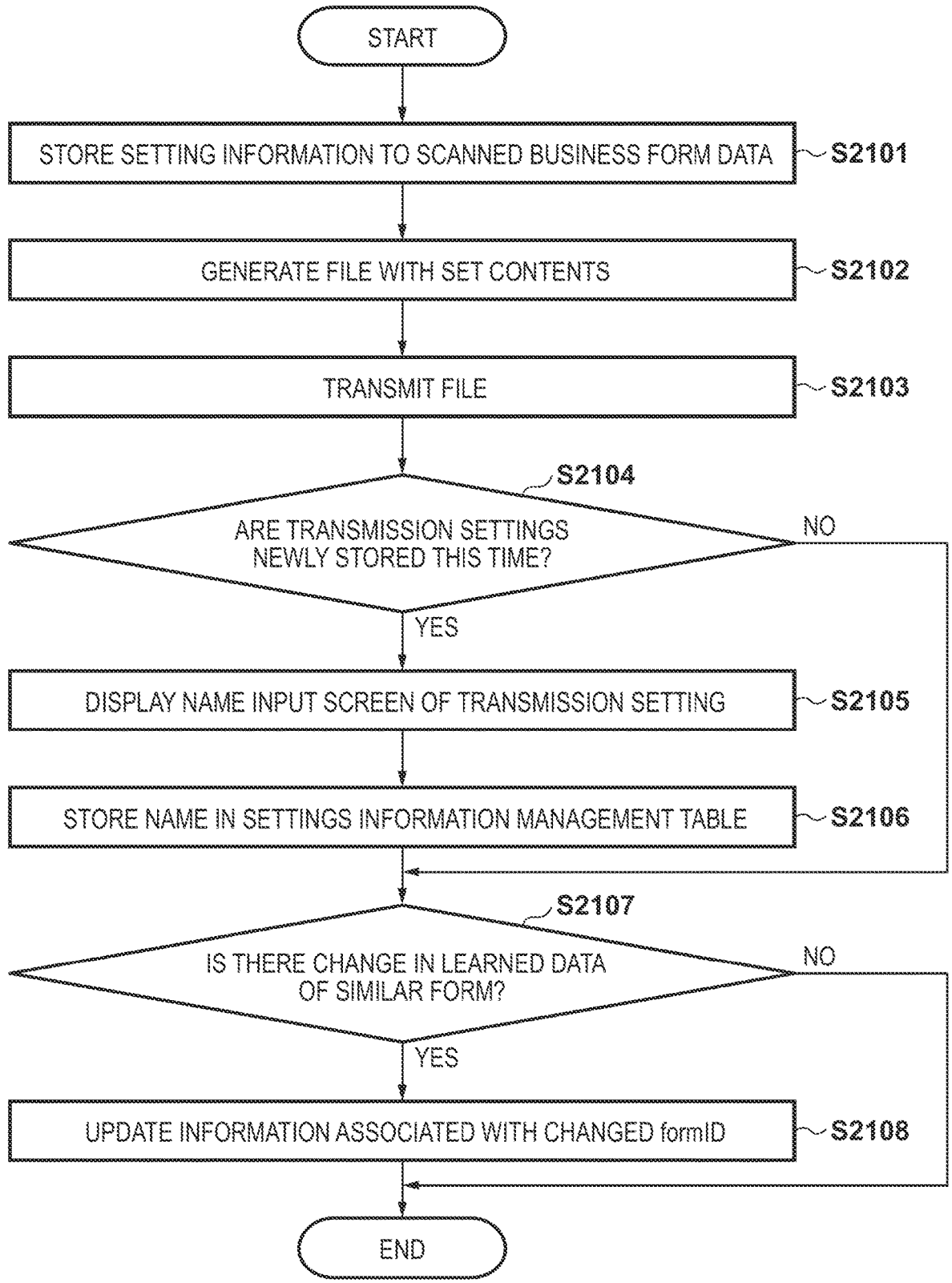
FIG. 21 is a flowchart for describing the processing of the MFP cooperative service according to this embodiment using the information set in the scanned business form data to create a file and transmit the file to the set destination.

FIG. 21 is a flowchart for describing the processing of the MFP cooperative service 120 according to this embodiment using the information set in the scanned business form data to create a file and transmit the file to the set destination. The flow corresponds to the processing from steps S619 to S622 of FIG. 6. The processing indicated in the flowchart is implemented by the CPU 311 deploying a program stored in the ROM 312 or the HDD 314 on the RAM 313 and executing the deployed program.

When the save button 809 is pressed on the screen of a list of the scanned business form data, the process proceeds to step S2101 where the CPU 311 stores the setting information indicated in the job properties 804 with the scanned business form data. The process then proceeds to step S2102, and the CPU 311 creates a file with the set output settings and file name. Then, the process proceeds to step S2103, and the CPU 311 functions as the cloud storage access module 433 and transmits the file created in step S2102 to the folder of the set cloud storage destination. At this time, if there are metadata setting values, these setting values are also transmitted at the same time. Accordingly, the scanned business form data is stored in the cloud storage 130.

Next, the process proceeds to step S2104, and the CPU 311 determines whether or not the transmission settings are transmission settings newly registered this time in the setting information management table 1601. Here, in a case in which it is determined that the transmission settings are newly registered, the process proceeds to step S2105. Otherwise, the process proceeds to step S2107. In step S2105, the CPU 311 transmits the screen information for inputting the name of the transmission settings to the client PC 111, and the user inputs the name of the current transmission settings. Then the process proceeds to step S2106, and the CPU 311 receives the name input by the user from the client PC 111, associates the name with the transmission settings and stores it in the setting information management table 1601. The process then proceeds to step S2107.

In step S2107, the CPU 311 determines whether or not information has been updated after the save button 809 has been clicked. This mainly corresponds to a change of the character region of the OCR character string. Here, in a case in which it is determined that the character region of the OCR character string has been changed before transmission, the process proceeds to step S2108. Otherwise the processing ends. In step S2108, the CPU 311 updates the formID associated in the setting information management table 1601, and the processing ends.

In this manner, a name can be assigned to newly input transmission settings and the setting information management table can be managed. Also, the character string of a region that is the same as that of an updated OCR character string can be used for the next similar business form data.

Next, a case in which a portion of the settings are changed after the user has selected the settings to appropriate in FIG. 9A will be described. In the example described above, FIG. 14B is displayed after the settings to appropriate are selected in FIG. 9A. However, it may be displayed in a state with the settings reflected on the screen where the settings can be changed of FIG. 8A. In this case, the settings can be changed without pressing the button 1402 for changing the settings of FIG. 14B. As this allows the screen of FIG. 14B to be skipped, this is convenient for a user that often appropriates existing settings, changes a portion of the settings, and saves them as different transmission settings.

When the save button 809 is pressed after a portion of the settings has been changed from the state with the settings reflected on the screen of FIG. 8A, in step S1905 of FIG. 19, confirmation of whether or not to overwrite and save being displayed every time is inconvenient. Thus, in a case in which settings are appropriated for unlearned business form data and a portion of the settings are changed, the processing of step S1905 may be skipped, and the processing of step S1907 to save the settings as a separate business form data may be executed.

In another plausible example, unchanged settings may be managed under common settings and only changed settings may be managed under a separate setting. For example, by making all of the settings for the cloud storage 130 the same and common, when the cloud storage is changed, the changes can be conveniently done just once. Also, in a case in which only the destination setting is common, by only changing the destination of a single scanned business form data, the destination of other business form data can be changed. At this time, the change does not affect other settings that are not shared, such as the file name rules and the like. This can be implemented, for example, by the formID being associated on a per setting basis in the setting information management table 1601, the settings including destination, root folder, folder rules, and the like.

According to the embodiment describe above, when a user sets the settings for transmitting image data to a cloud service, the settings for similar image data previously set by the user can be reflected, allowing the ease of use when setting the settings to be improved. Also, because only transmission settings associated with image data previously used by the user can be appropriated for the transmission settings of new image data, the ease of use when changing settings can be improved.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-148079, filed Sep. 10, 2021, which is hereby incorporated by reference herein in its entirety.

What is claimed is:

1. A server configured to access a cloud service comprising:
one or more controllers including one or more processors and one or more memories, the one or more controllers configured to:
store a plurality of pieces of image data in a storage;
present, to an information processing apparatus, a first setting screen that enables a user to select whether or not to appropriate a transmission setting of image data other than target image data for transmission of the stored plurality of pieces of image data to a transmission setting of the target image data in a case where image data similar to the target image data is not stored in the storage;
present, to the information processing apparatus, a selection screen for displaying a list of transmission settings able to be appropriated and enabling the user to select a transmission setting to be appropriated from the list in a case an appropriation of the transmission setting is selected via the first setting screen;
present, to the information processing apparatus, a second setting screen in which the transmission setting selected via the selection screen is reflected, wherein the second setting screen enables the user to enter settings of the target image data;
store, in the storage, the settings of the target image data entered by the user via the second setting screen associated with the target image data and information of the user; and
transmit the target image data to the cloud service in accordance with the settings of the target image data stored in the storage,
wherein the second setting screen includes an area that enables the user to select a character region included in the target image data to obtain a type of the target image data in the settings of the target image data.

2. The server according to claim 1, wherein the appropriated transmission setting includes a setting relating to at least one of destination of the target image data, a folder, a region in image data for setting a file name, or a file format of the target image data.

3. The server according to claim 1, wherein the server is operable to communicate with an image forming apparatus, and wherein the plurality of pieces of image data are generated by reading documents with the image forming apparatus and received from the image forming apparatus.

4. The server according to claim 1, wherein the image data similar to the target image data is determined based on whether or not the type of the image data is the same type of the target image data.

5. The server according to claim 4, wherein the type of the image data is determined at least on a basis of a character region in the image data.

6. The server according to claim 5, wherein the type of the image data is further determined on a basis of a result of character recognition of character information of the character region.

7. The server according to claim 1,
wherein the first setting screen further includes an item for causing the user to newly set a transmission setting of the target image data, and
wherein the one or more controllers are configured to present, to the information processing apparatus, a setting screen that enables the user to enter all settings of the target image data.

8. The server according to claim 1,
wherein the one or more controllers are further configured to authenticate the user of the information processing apparatus; and
wherein the one or more controllers present, when presenting the first and second setting screens, the first and second setting screens corresponding to information of the authenticated user.

9. The server according to claim 8, wherein the one or more controllers are configured to present, when presenting the screen for displaying the list of transmission settings, the list including the transmission settings of the stored image data related to the information of the authenticated user.

10. The server according to claim 8, wherein when presenting the first setting screen, in a case in which transmission settings related to the information of the authenticated user are not stored in the storage, the one or more controllers are configured to not present the first setting screen that enables the user to select whether or not to appropriate the transmission setting of image data other than target image data.

11. The server according to claim 1, wherein, in a case in which, after transmission setting selected via the selection screen has been reflected on the second setting screen, the user changes the reflected transmission setting to different transmission setting on the second setting screen, the one or more controllers are further configured to present, to the information processing apparatus, a screen for selecting whether to reflect identical transmission setting in originally stored transmission setting or store the identical transmission setting as separate transmission setting.

12. The server according to claim 11, wherein the one or more controllers are further configured to, in a case in which, after transmission setting selected via the selection screen has been reflected on the second setting screen in the target image data, the user changes the reflected transmission setting to different transmission setting on the first setting screen, skip displaying of the screen and store the different transmission setting as separate transmission setting.

13. A method of controlling a server that stores a plurality of pieces of image data in a storage and accesses a cloud service, the method comprising:
- presenting, to an information processing apparatus, a first setting screen that enables a user to select whether or not to appropriate a transmission setting of image data other than target image data for transmission of the stored plurality of pieces of image data to a transmission setting of the target image data in a case where image data similar to the target image data is not stored in the storage;
- presenting, to the information processing apparatus, a selection screen for displaying a list of transmission settings able to be appropriated and enabling the user to select a transmission setting to be appropriated from the list in a case an appropriation of the transmission setting is selected via the first setting screen;
- presenting, to the information processing apparatus, a second setting screen in which the transmission setting selected via the selection screen is reflected, wherein the second setting screen enables the user to enter settings of the target image data;
- storing, in the storage, the settings of the target image data entered by the user via the second setting screen associated with the target image data and information of the user; and
- transmitting the target image data to the cloud service in accordance with the settings relating to the target image data stored in the storage,
- wherein the second setting screen includes an area that enables the user to select a character region included in the target image data to obtain a type of the target image data in the settings of the target image data.

14. A non-transitory computer-readable storage medium storing a program for causing a processor to execute a method of controlling a server that stores a plurality of pieces of image data in a storage and accesses a cloud service, the method comprising:
- presenting, to an information processing apparatus, a first setting screen that enables a user to select whether or not to appropriate a transmission setting of image data other than target image data for transmission of the stored plurality of pieces of image data to a transmission setting of the target image data in a case where image data similar to the target image data is not stored in the storage;
- presenting, to the information processing apparatus, a selection screen for displaying a list of transmission settings able to be appropriated and enabling the user to select a transmission setting to be appropriated from the list in a case an appropriation of the transmission setting is selected via the first setting screen;
- presenting, to the information processing apparatus, a second setting screen in which the transmission setting selected via the selection screen is reflected, wherein the second setting screen enables the user to enter settings of the target image data;
- storing, in the storage, the settings of the target image data entered by the user via the second setting screen associated with the target image data and information of the user; and
- transmitting the target image data to the cloud service in accordance with the settings relating to the target image data stored in the storage,
- wherein the second setting screen includes an area that enables the user to select a character region included in the target image data to obtain a type of the target image data in the settings of the target image data.

* * * * *